(12) United States Patent
Kawaguchi

(10) Patent No.: US 8,250,031 B2
(45) Date of Patent: Aug. 21, 2012

(54) LOW TRAFFIC FAILBACK REMOTE COPY

(75) Inventor: Tomohiro Kawaguchi, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 574 days.

(21) Appl. No.: 12/230,214

(22) Filed: Aug. 26, 2008

(65) Prior Publication Data

US 2010/0057789 A1 Mar. 4, 2010

(51) Int. Cl.
*G06F 17/00* (2006.01)
(52) U.S. Cl. ........ 707/625; 707/633; 707/639; 707/648; 707/649
(58) Field of Classification Search .................. 707/609, 707/625, 633, 639, 648, 649, 698
See application file for complete search history.

(56) References Cited

U.S. PATENT DOCUMENTS

| | | | |
|---|---|---|---|
| 6,526,418 B1* | 2/2003 | Midgley et al. ........................ 1/1 |
| 6,625,623 B1* | 9/2003 | Midgley et al. ........................ 1/1 |
| 7,133,987 B2* | 11/2006 | Watanabe et al. ............ 711/162 |
| 7,152,079 B2 | 12/2006 | Hirakawa et al. |
| 7,308,545 B1* | 12/2007 | Kekre et al. ................... 711/162 |
| 7,567,991 B2* | 7/2009 | Armangau et al. .................... 1/1 |
| 7,721,055 B2* | 5/2010 | Saika ............................ 711/154 |
| 7,840,766 B2* | 11/2010 | Eguchi et al. ................. 711/162 |
| 8,001,344 B2* | 8/2011 | Uchida et al. ................. 711/162 |
| 8,082,232 B2* | 12/2011 | Okada et al. .................. 707/682 |
| 2004/0267836 A1* | 12/2004 | Armangau et al. ............ 707/203 |
| 2005/0028022 A1* | 2/2005 | Amano ............................. 714/2 |
| 2005/0193245 A1* | 9/2005 | Hayden et al. .................. 714/13 |
| 2006/0085608 A1* | 4/2006 | Saika ............................. 711/162 |
| 2006/0149798 A1* | 7/2006 | Yamagami .................... 707/204 |
| 2006/0184728 A1* | 8/2006 | Yamagami .................... 711/111 |
| 2006/0184764 A1* | 8/2006 | Osaki ............................ 711/216 |
| 2006/0236047 A1* | 10/2006 | Shitomi ........................ 711/162 |
| 2006/0277378 A1* | 12/2006 | Morishita et al. ............. 711/162 |
| 2007/0038824 A1* | 2/2007 | Suishu et al. ................. 711/162 |
| 2007/0050547 A1* | 3/2007 | Sano et al. .................... 711/114 |
| 2007/0050574 A1* | 3/2007 | Kaiya et al. ................... 711/162 |
| 2007/0067585 A1* | 3/2007 | Ueda et al. .................... 711/162 |
| 2007/0094467 A1* | 4/2007 | Yamasaki ..................... 711/162 |
| 2007/0112893 A1* | 5/2007 | Okada et al. .................. 707/204 |
| 2007/0150677 A1* | 6/2007 | Homma et al. ................ 711/162 |
| 2007/0179994 A1* | 8/2007 | Deguchi et al. ............... 707/202 |
| 2007/0180000 A1* | 8/2007 | Mine et al. .................... 707/204 |
| 2007/0198604 A1* | 8/2007 | Okada et al. .................. 707/202 |
| 2007/0271429 A1* | 11/2007 | Eguchi et al. ................. 711/162 |
| 2007/0294495 A1* | 12/2007 | Uchida et al. ................. 711/162 |
| 2008/0082770 A1* | 4/2008 | Ahal et al. .................... 711/162 |
| 2009/0276661 A1* | 11/2009 | Deguchi et al. ................. 714/18 |
| 2010/0077165 A1* | 3/2010 | Lu et al. ........................ 711/162 |

* cited by examiner

Primary Examiner — Thanh-Ha Dang
(74) Attorney, Agent, or Firm — Mattingly & Malur, PC

(57) ABSTRACT

The local storage performs remote copy to the remote storage. For low traffic failback remote copy, the remote storage performs a delta copy to the local storage, the delta being the difference between the remote storage and local storage. The local storage backs up snapshot data. The remote storage resolves the difference of the snapshot of the local storage and the remote storage. The difference resolution method can take one of several approaches. First, the system informs the timing of snapshot of the local storage to the remote storage and records the accessed area of the data. Second, the system informs the timing of snapshot of the local storage to the remote storage, and the remote storage makes a snapshot and compares the snapshot and remote copied data. Third, the system compares the local data and remote copy data with hashed data.

11 Claims, 41 Drawing Sheets

| Online Vol# | Remote Copy Vol# | Backup Tape# |
|---|---|---|
| 0 | 0 | 130 |
| 1 | 1 | 537 |
| 2 | N/A | N/A |
| 3 | N/A | N/A |
| 4 | N/A | N/A |
| 5 | N/A | N/A |
| 6 | N/A | N/A |
| 7 | N/A | N/A |

Catalogue Management Table

FIG. 2

| RAID Gr.# | RAID Lv. | HDD# | Capacity |
|---|---|---|---|
| 0 | 10 | 0,1,2,3 | 600[GB] |
| 1 | 5 | 4,5,6,7 | 900[GB] |
| 2 | 6 | 8,9,10,11,12,13,14,15 | 1800[GB] |
| 3 | 10 | 32,33,34,35 | 600[GB] |
| 4 | N/A | N/A | 0[GB] |
| 5 | N/A | N/A | 0[GB] |
| 6 | 5 | 64,65,66,67,68,69,70,71 | 2100[GB] |
| 7 | 10 | 42,43,44,45 | 300[GB] |

RAID Group Management Table

FIG. 4

| Vol# | RAID Gr.# | Area | Capacity |
|---|---|---|---|
| 0 | 0 | 0x0000~0x01FF | 100[GB] |
| 1 | 0 | 0x0200~0x07FF | 300[GB] |
| 2 | 0 | 0x0800~0x0CFF | 200[GB] |
| 3 | 1 | 0x0000~0x0CFF | 600[GB] |
| 4 | 1 | 0x0D00~0x11FF | 0[GB] |
| 5 | 2 | 0x0000~0x23FF | N/A |
| 6 | N/A | N/A | 0[GB] |
| 7 | N/A | N/A | 0[GB] |

Logical Volume Management Table

Snapshot Pair Management Table (112-15-1)

| Vol# (112-15-1-1) | Snapshot Pair Status (112-15-1-2) | Paired Vol# (112-15-1-3) | Attribution (112-15-1-4) |
|---|---|---|---|
| 0 | PAIR | 1 | Source |
| 1 | PAIR | 0 | Target |
| 2 | PSUS | 2 | Source |
| 3 | PSUS | 3 | Target |
| 4 | SMPL | N/A | N/A |
| 5 | SMPL | N/A | N/A |
| 6 | SMPL | N/A | N/A |
| 7 | SMPL | N/A | N/A |

| Start Address | Status |
|---|---|
| 0x0000 | Changed |
| 0x0001 | Changed |
| 0x0002 | Unchanged |
| 0x0003 | Unchanged |
| 0x0004 | Unchanged |
| 0x0005 | Unchanged |
| 0x0006 | Unchanged |
| 0x0007 | Changed |

Snapshot Difference Table

FIG. 7

| 112-16-1-1 | 112-16-1-2 | 112-16-1-3 | 112-16-1-4 | 112-16-1-5 | 112-16-1-6 |
|---|---|---|---|---|---|
| Vol# | Remote Copy Pair Status | Storage Subsystem# | Paired Vol# | Journal Vol# | Attribution |
| 0 | PAIR | 1 | 0 | 7 | Source |
| 1 | SMPL | N/A | N/A | N/A | N/A |
| 2 | PSUS | 1 | 2 | 7 | Target |
| 3 | SMPL | N/A | N/A | N/A | N/A |
| 4 | SMPL | N/A | N/A | N/A | N/A |
| 5 | SMPL | N/A | N/A | N/A | N/A |
| 6 | SMPL | N/A | N/A | N/A | N/A |
| 7 | SMPL | N/A | N/A | N/A | Journal |

112-16-1

Remote Copy Pair Management Table

FIG. 8

| Start Address | Status |
|---|---|
| 0x0000 | Unchanged |
| 0x0001 | Changed |
| 0x0002 | Unchanged |
| 0x0003 | Changed |
| 0x0004 | Changed |
| 0x0005 | Unchanged |
| 0x0006 | Unchanged |
| 0x0007 | Changed |

Remote Copy Difference Table

| Vol# | Attribution | Next Journal Address |
|---|---|---|
| 0 | N/A | N/A |
| 1 | N/A | N/A |
| 2 | N/A | N/A |
| 3 | N/A | N/A |
| 4 | N/A | N/A |
| 5 | N/A | N/A |
| 6 | N/A | N/A |
| 7 | Journal | 0x1725 |

Remote Copy Journal Management Table 112-16-3-1, 112-16-3-2, 112-16-1-3, 112-16-3

FIG. 28

Catalogue Management Table (501')

| Remote Copy Vol# (501'-1) | Generation (501'-2) | Local Backup Tape# (501'-3) | Remote Backup Tape# (501'-4) |
|---|---|---|---|
| 0 | 0 | 76 | 231 |
| 0 | 1 | 234 | 357 |
| 0 | 2 | 15 | 39 |
| 1 | 0 | 136 | 21 |
| 1 | 1 | 75 | 226 |
| 2 | 0 | 189 | 304 |
| 2 | 0 | 23 | 115 |
| 3 | 1 | 4 | 91 |

LOW TRAFFIC FAILBACK REMOTE COPY

BACKGROUND OF THE INVENTION

The present invention relates generally to remote copy in storage systems and, more particularly, to methods and apparatus for low traffic failback remote copy.

The remote copy function in a storage system supports synchronous or asynchronous I/O replication between volumes of local and remote storage subsystems. Asynchronous remote copy function can maintain the consistency of I/O order. When a shutdown or some other failure occurs at the local storage subsystem, the remote storage subsystem takes over the data in a failover process. During failover, the remote storage subsystem will be accessed to continue processing data. After the local storage is repaired, the local storage is restored using data from the remote storage subsystem in a failback process. By recording the accessed area during the period from failover to failback, the storage system can perform a delta copy instead of a full copy, thereby decreasing the traffic for failback.

The delta copy, however, requires that the local storage subsystem continue to be active after failback and not lose data. When the local storage subsystem loses data or when it needs to restore to another storage subsystem, the data in the remote storage subsystem has to be copied entirely. This causes a data traffic increase.

BRIEF SUMMARY OF THE INVENTION

Embodiments of the invention provide methods and apparatus for low traffic failback remote copy. The local storage performs remote copy to the remote storage. The remote storage performs a delta copy to the local storage, the delta being the difference between the remote storage and local storage. The local storage backs up snapshot data. The remote storage resolves the difference of the snapshot of the local storage and the remote storage. The difference resolution method can take one of several approaches. First, the system informs the timing of snapshot of the local storage to the remote storage and records the accessed area of the data. Second, the system informs the timing of snapshot of the local storage to the remote storage, and the remote storage makes a snapshot and compares the snapshot and remote copied data. Third, the system compares the local data and remote copy data with hashed data.

In accordance with an aspect of the present invention, a computer system for restoring data comprises a first storage device including a first volume to store data; a first snapshot device configured to store snapshot data of the data stored in the first storage device; a second storage device including a second volume to copy data from the first volume until the first storage device is shutdown at a shutdown time and to provide access to data stored in the second volume subsequent to the shutdown time. For restoring data in the first storage device at a restoring time subsequent to the shutdown time, the second storage device is configured to determine a difference data between the snapshot data stored in the first snapshot device at a restored snapshot time before the shutdown time of the first storage device and the remote copy data stored in the second volume of the second storage device at the restoring time, and to provide the difference data to the first storage device. The first storage device is configured to restore the data stored in the second volume of the second storage device at the restoring time in the first volume of the first storage device based on the snapshot data stored in the first snapshot device at the restored snapshot time and the difference data from the second storage device.

In some embodiments, the computer system further includes a snapshot difference table identifying changed portions of the data in the first volume of the first storage device which have been changed between the restored snapshot time and an intermediate time which is between the shutdown time and the restoring time; and a remote copy difference table identifying changed portions of the data in the second volume of the second storage device which have been changed between the intermediate time and the restoring time. The second storage device is configured to determine a different data area which includes the changed portions of the data from the snapshot difference table and the changed portions of the data from the remote copy difference table, and to determine the difference data between the snapshot data at the restored snapshot time and the remote copy data at the restoring time in the different data area. The first storage device is configured to provide asynchronous copy for copying data from the first volume of the first storage device to the second volume of the second storage device, the data including a snapshot time for each time that snapshot data is stored in the first snapshot device. The intermediate time may be the shutdown time.

In specific embodiments, the computer system further comprises a second snapshot device configured to store snapshot data of the data stored in the second storage device. The second snapshot device contains the same snapshot data at the restored snapshot time as contained in the first snapshot device. The second storage device is configured to determine a difference data between the snapshot data stored in the second snapshot device at the restored snapshot time and the remote copy data stored in the second volume of the second storage device at the restoring time. The first storage device is configured to provide asynchronous copy for copying data from the first volume of the first storage device to the second volume of the second storage device, the data including a snapshot time for each time that snapshot data is stored in the first snapshot device.

In some embodiments, the computer system further comprises a second snapshot device configured to store snapshot data of the data stored in the second storage device; and a remote copy difference table identifying changed portions of the data in the second volume of the second storage device which have been changed between the shutdown time and the restoring time. The second storage device is configured to determine a remote copy snapshot difference by comparing snapshot data at the restored snapshot time from the second snapshot device and the remote copy data in the second volume at the restoring time, and to identify changed portions of the data due to the remote copy snapshot difference. The second storage device is configured to determine a different data area which includes the changed portions of the data from the remote copy difference table and the changed portions of the data due to the remote copy snapshot difference, and to determine the difference data between the snapshot data at the restored snapshot time and the remote copy data at the restoring time in the different data area.

In specific embodiments, the first storage device is configured to calculate a hash value for each portion of data in the first volume. The second storage device is configured to calculate a corresponding hash value for each portion of data in the second volume corresponding to each portion of data in the first volume. The second storage device is configured to compare the hash value for each portion of data in the first volume and the hash value for each corresponding portion of data in the second volume, and to identify a different data area which includes the changed portions of the data for which the hash value and the corresponding hash value are different. The second storage device is configured to determine the difference data between the snapshot data at the restored snapshot time and the remote copy data at the restoring time in the different data area.

Another aspect of the invention is directed to a method for restoring data in a computer system which includes a first storage device including a first volume to store data, a first snapshot device configured to store snapshot data of the data stored in the first storage device, and a second storage device including a second volume to copy data from the first volume until the first storage device is shutdown at a shutdown time and to provide access to data stored in the second volume subsequent to the shutdown time. The method comprises, for restoring data in the first storage device at a restoring time subsequent to the shutdown time, determining a difference data between the snapshot data stored in the first snapshot device at a restored snapshot time before the shutdown time of the first storage device and the remote copy data stored in the second volume of the second storage device at the restoring time, and to provide the difference data to the first storage device; and restoring the data stored in the second volume of the second storage device at the restoring time in the first volume of the first storage device based on the snapshot data stored in the first snapshot device at the restored snapshot time and the difference data from the second storage device.

These and other features and advantages of the present invention will become apparent to those of ordinary skill in the art in view of the following detailed description of the specific embodiments.

BRIEF DESCRIPTION OF THE DRAWINGS

FIG. 2 illustrates an example of the Catalogue Management Table in FIG. 1.

FIG. 4 illustrates an example of a RAID Group Management Table in FIG. 3.

FIG. 5 illustrates an example of a Logical Volume Management Table in FIG. 3.

FIG. 6 illustrates an example of a Snapshot Pair Management Table in FIG. 3.

FIG. 7 illustrates an example of a Snapshot Difference Table in FIG. 3.

FIG. 8 illustrates an example of a Remote Copy Pair Management Table in FIG. 3.

FIG. 9 illustrates an example of a Remote Copy Difference Table in FIG. 3.

FIG. 10 illustrates an example of a Remote Copy Journal Management Table in FIG. 3.

FIG. 28 illustrates an example of the Catalogue Management Table in FIG. 27.

DETAILED DESCRIPTION OF THE INVENTION

Figure 1:
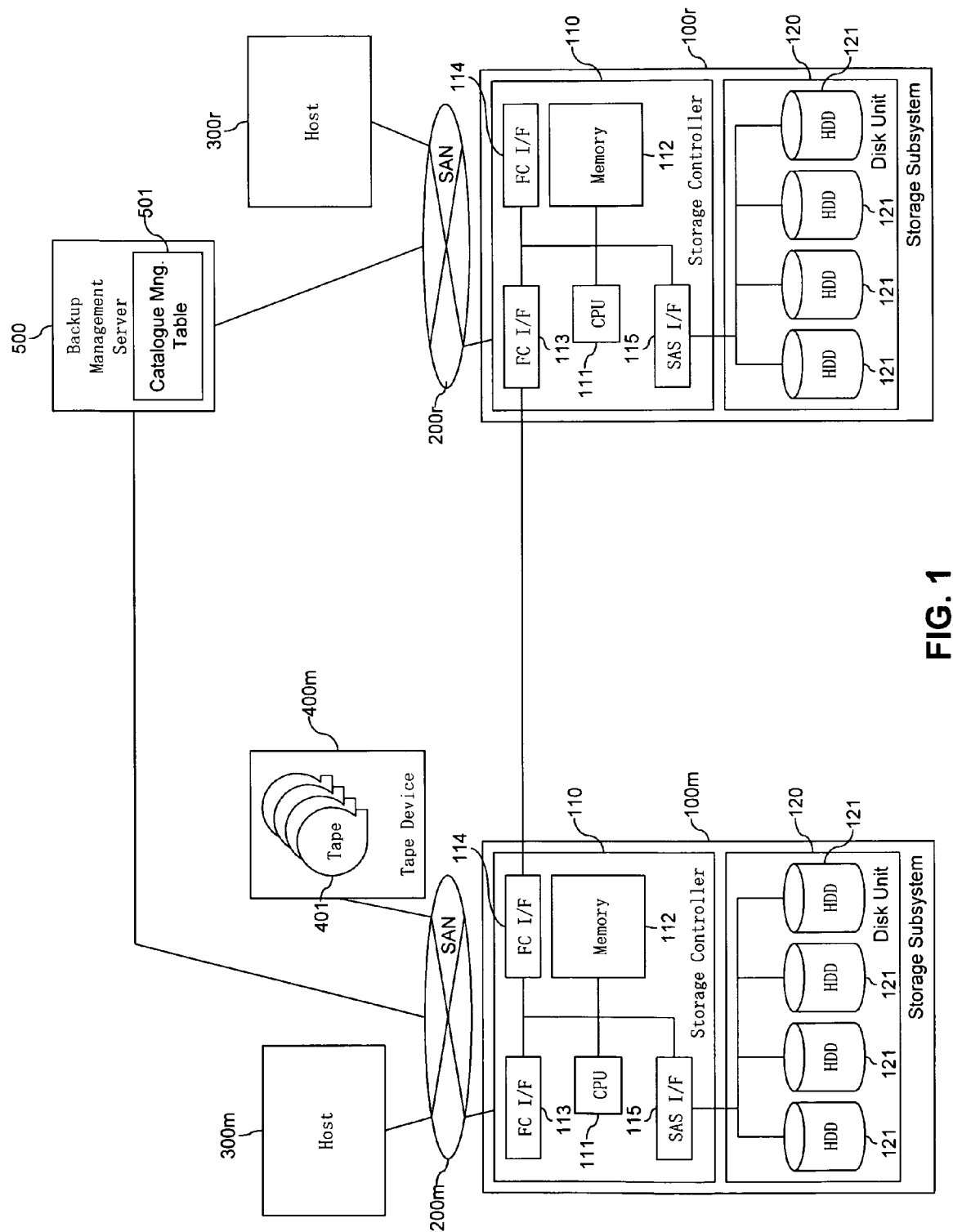
FIG. 1 illustrates the hardware configuration of a system according to a first embodiment in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment", "this embodiment", or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Exemplary embodiments of the invention, as will be described in greater detail below, provide apparatuses, methods and computer programs for low traffic failback remote copy.

First Embodiment

FIG. 1 illustrates the hardware configuration of a system according to a first embodiment in which the method and apparatus of the invention may be applied. A first storage subsystem 100m and a second storage subsystem 100r have the same structure and are connected with each other via channel interfaces 113, 114. The first storage subsystem 100m may be a local subsystem, and the second storage subsystem 100r may be a remote subsystem. The channel interfaces 113 of the two subsystems 100m, 100r are linked to a first network 200 m and a second network 200 r, respectively. The other channel interface 114 is linked to another storage subsystem. Each storage subsystem includes a storage controller 110 having a CPU 111 which runs programs in a memory 112. The memory 112 stores storage control programs, tables and cache data. A disk interface 115 is linked to disks 121 in the disk unit 120 for storing data. A first host computer 300m is connected to the first network 200 m, and a second host computer 300r is connected to the second network 200 r. The first host computer 300m can access the first storage subsystem 100m via the first network 200 m, while the second host computer 300r can access the second storage subsystem 100r via the second network 200 r. A tape device 400m has at least one tape 401 for storing data. A backup management server 500 manages the snapshot data in the tape device 400m and the remote copy data in the second storage subsystem 100r. The backup management server 500 contains a Catalogue Management Table 501.

FIG. 2 illustrates an example of the Catalogue Management Table 501. The Table 501 contains a column for online volume number 501-1 listing the IDs of volumes in the first storage subsystem 100m; a column for remote copy volume number 501-2 listing the IDs of volumes in the second storage subsystem 100r, which are remote pair volumes; and a column for backup tape number 501-3 listing the IDs of the tapes 401 in the tape device 400m. The backup tape has snapshot data of the volume associated with the tape.

Figure 3:
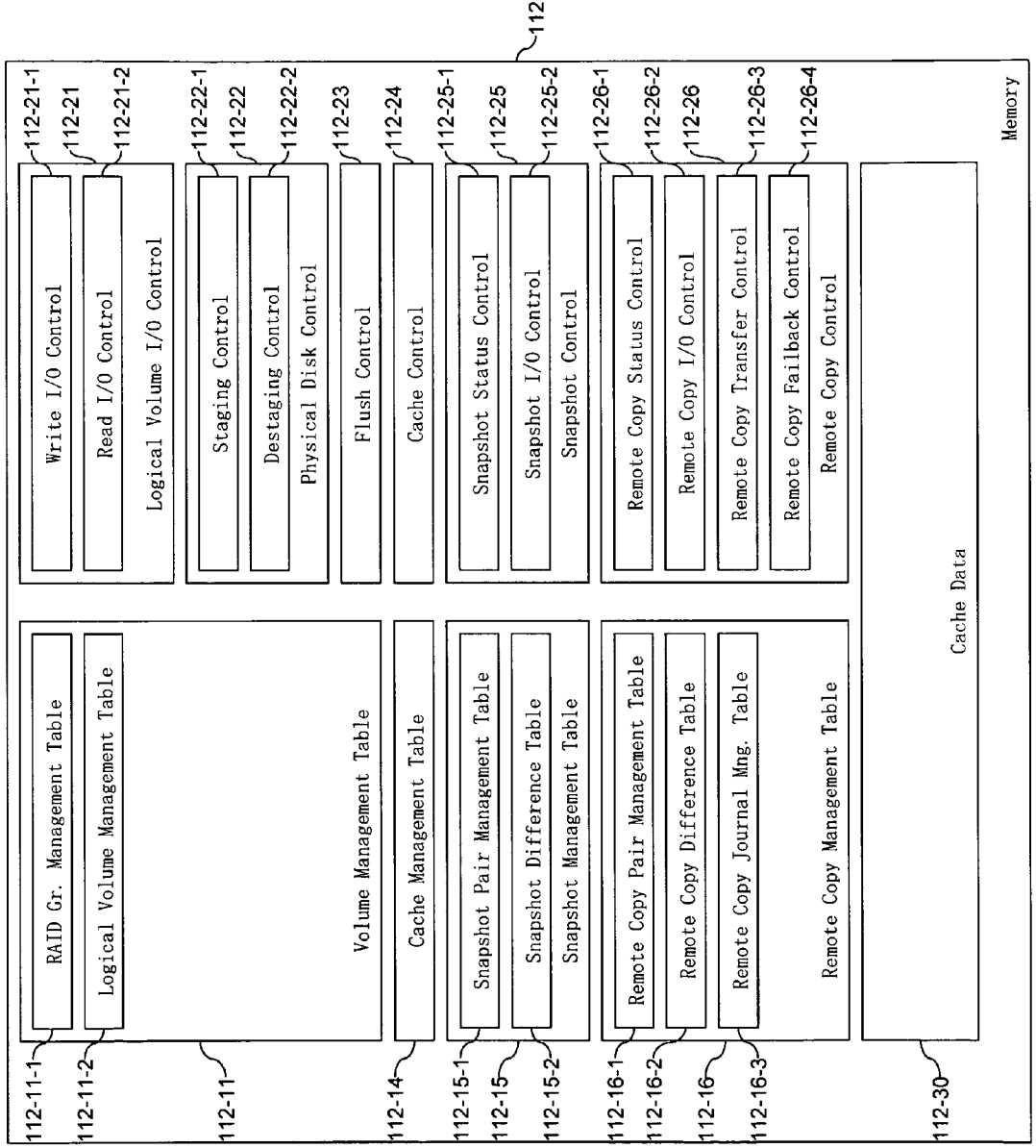
FIG. 3 illustrates an example of a memory in FIG. 1.

FIG. 3 illustrates an example of a memory 112. The memory 112 contains a Volume Management Table 112-11 that includes a RAID Group Management Table 112-11-1 which is a physical structure management table for the disks 121, and a Logical Volume Management Table 112-11-2 containing partitioning information of RAID groups. The memory 112 includes a Cache Management Table 112-14 which is used for the management of the cache area 112-30 and serves as a general table for the LRU/MRU algorithm. A Snapshot Management Table 112-15 includes a Snapshot Pair Management Table 112-15-1 containing snapshot pair information of two volumes, and a Snapshot Difference Table 112-15-2 used in the management of accessed area of snapshotted volumes. A Remote Copy Management Table 112-16 includes a Remote Copy Pair Management Table 112-16-1 containing remote copy pair information between two volumes of two storage subsystems and journal volume information, a Remote Copy Difference Table 112-16-2 containing accessed area information after failover occurs, and a Remote Copy Journal Management Table 112-16-3.

The memory 112 includes Logical Volume I/O Control 112-21. The Logical Volume I/O Control 112-21 includes Write I/O Control 112-21-1 that runs by write I/O requirements and receives write data and stores it to the cache area 112-30. The Logical Volume I/O Control 112-21-1 further includes Read I/O Control 112-21-2 that runs by read I/O requirements and sends read data into the cache area 112-30. The Physical Disk Control 112-22-1 includes Staging Control 112-22-1 that reads from the disks 121 and stores to the cache area 112-30, and Destaging Control 112-22-2 that reads from the cache area 112-30 and stores to the disks 121. The memory 112 further includes Flush Control 112-25 that periodically flushes cache data to the disks, and Cache Control 112-24 that searches a cache area and/or allocates a new cache area. The Snapshot Control 112-25 includes Snapshot Status Control 112-25-1 that changes snapshot pair status by user/system requirement and does whole volume copy when pair status changes, and Snapshot I/O Control 112-25-2 that replicates write I/O to a snapshot volume when needed and records write I/O area when needed. The Remote Copy Control 112-26 includes Remote Copy Status Control 112-26-1 that changes remote copy pair status by user/system requirement and does whole volume copy when pair status changes, Remote Copy I/O Control 112-26-2 that replicates write I/O to a journal volume when needed and records write I/O area when needed, Remote Copy Transfer Control 112-26-3 that periodically reads from a journal volume of other storage subsystem and stores to its own remote copy volumes, and Remote Copy Failback Control 112-26-4 that writes difference data from its own remote copy volumes to the online volumes of other storage subsystems. The cache area 112-30 stores read and write cache data.

FIG. 4 illustrates an example of a RAID Group Management Table 112-11-1. The RAID group number column 112-11-1 lists the RAID group IDs of the storage subsystem. The RAID level column 112-11-1-2 lists the RAID level information such as 10, 5, 6, and so on. The disk number column 112-11-1-3 lists the ID numbers of the disks 121 that belong to the RAID group. The capacity column 112-11-1-4 lists the total logical capacity of the RAID group.

FIG. 5 illustrates an example of a Logical Volume Management Table 112-11-2. The logical volume number column 112-11-2-1 lists the IDs of logical volumes of the storage subsystem. The RAID group number column 112-11-2-2 lists the IDs of the RAID group for the logical volume that belongs to the RAID group. The partitioning area column 112-11-2-3 lists the address of the RAID group. The capacity column 112-11-2-4 lists the capacity of the logical volume.

FIG. 6 illustrates an example of a Snapshot Pair Management Table 112-15-1. The logical volume number column 112-15-1-1 lists the ID of the logical volume. The snapshot pair status column 112-15-1-2 lists the snapshot pair status, in which "PAIR" means that the logical volume is replicating, "PSUS" means that the logical volume already made a snapshot, "COPY" means that the logical volume is copying now, and "SMPL" means that the logical volume does not have pair. The paired logical volume number column 112-15-1-3 lists a paired logical volume ID. The logical volume attribution column 112-15-1-4 lists the purpose of the logical volume, in which "Source" is online volume and "Target" is snapshot volume.

FIG. 7 illustrates an example of a Snapshot Difference Table 112-15-2. The start address column 112-15-2-1 is a data area. The status column 112-15-2-2 lists the storage subsystem records indicating whether write I/Os occurred or not in the data area, in which "Changed" means write I/Os occurred in the data area, and "Unchanged" means write I/Os did not occur in the data area.

FIG. 8 illustrates an example of a Remote Copy Pair Management Table 112-16-1. The logical volume number column 112-16-1-1 lists the ID of the logical volume. The remote copy pair status column 112-16-1-2 lists the remote copy pair status, in which "PAIR" means that the logical volume is replicating, "PSUS" means that the logical volume already made a snapshot (i.e., failover occurred), "COPY" means that the logical volume is copying now, and "SMPL" means that the logical volume does not have pair. The storage subsystem number column 112-16-1-3 lists the storage subsystem ID of the remote copy pair volume. The paired logical volume number column 112-16-1-4 lists the paired logical volume ID in the remote storage subsystem. The journal volume number column 112-16-1-5 lists the data temporal storing volume ID. The attribution column 112-16-1-6 lists the purpose of the logical volume, in which "Source" is online volume, "Target" is snapshot volume, and "Journal" means that the logical volume is used as a journal volume.

FIG. 9 illustrates an example of a Remote Copy Difference Table 112-16-2. The start address column 112-16-2-1 is a data area. The status column 112-16-2-2 lists the storage subsystem records indicating whether write I/Os occurred or not in the data area, in which "Changed" means write I/Os occurred in the data area, and "Unchanged" means write I/Os did not occur in the data area.

FIG. 10 illustrates an example of a Remote Copy Journal Management Table 112-16-3. The logical volume number column 112-16-3-1 lists the ID of the logical volume. The logical volume attribution column 112-16-1-2 lists the remote copy journal volume attribution, in which "Journal" means that the logical volume is used as a journal volume. The next journal address column 112-16-13 lists the pointer of next data and header storing area.

Figure 11:
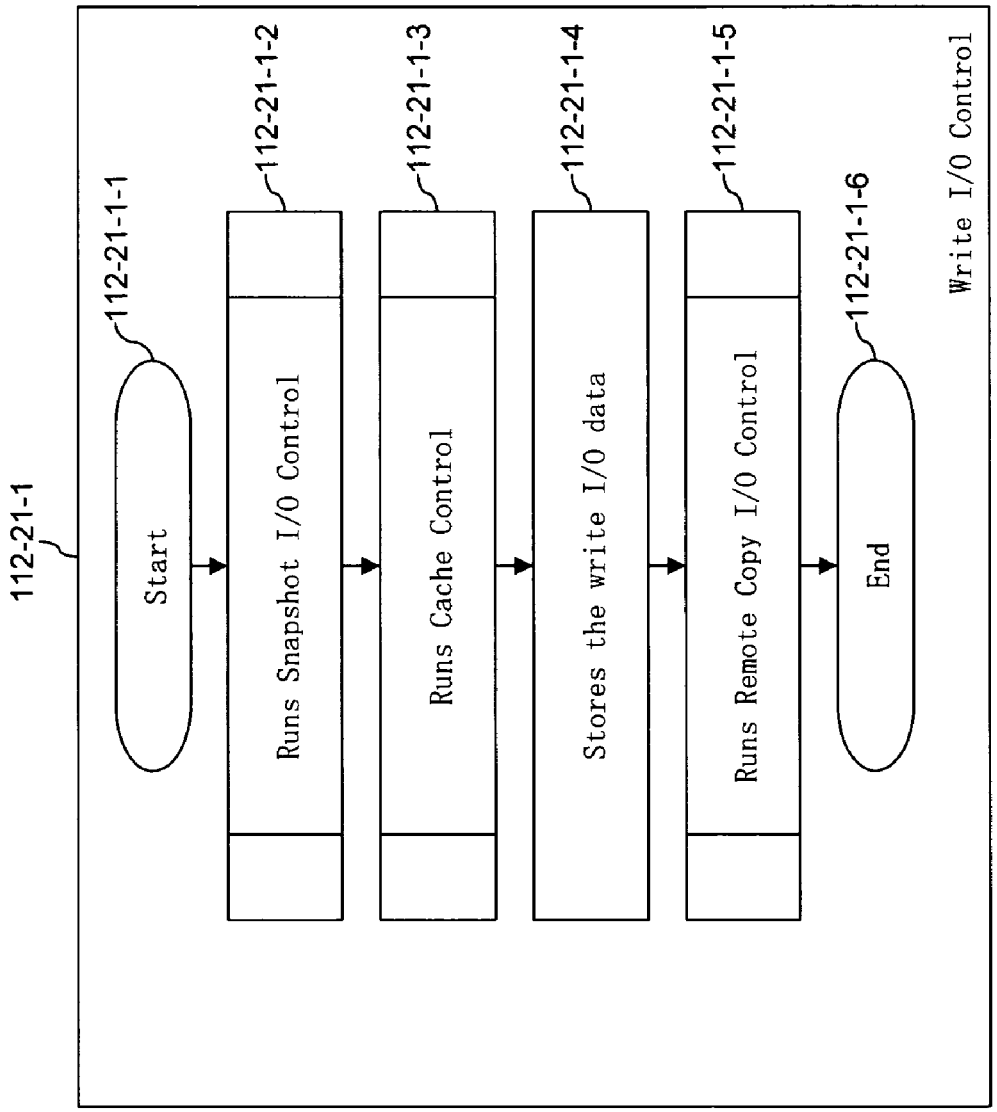
FIG. 11 illustrates an example of a process flow of the Write I/O Control in FIG. 3.

FIG. 11 illustrates an example of a process flow of the Write I/O Control 112-21-1. This program is run when a write I/O request occurs or another program calls. To start the process (112-21-1-1), the CPU 111 calls the Snapshot I/O Control 112-25-2 (step 112-21-1-2). The CPU 111 calls the Cache Control 112-24 to find or allocate the cache area (step 112-21-1-3), and stores the received data to the cache area 112-30 (step 112-21-1-4). The CPU 111 calls the Remote Copy I/O Control 112-26-2 (step 112-21-1-5) and the process ends (112-21-1-6).

Figure 12:
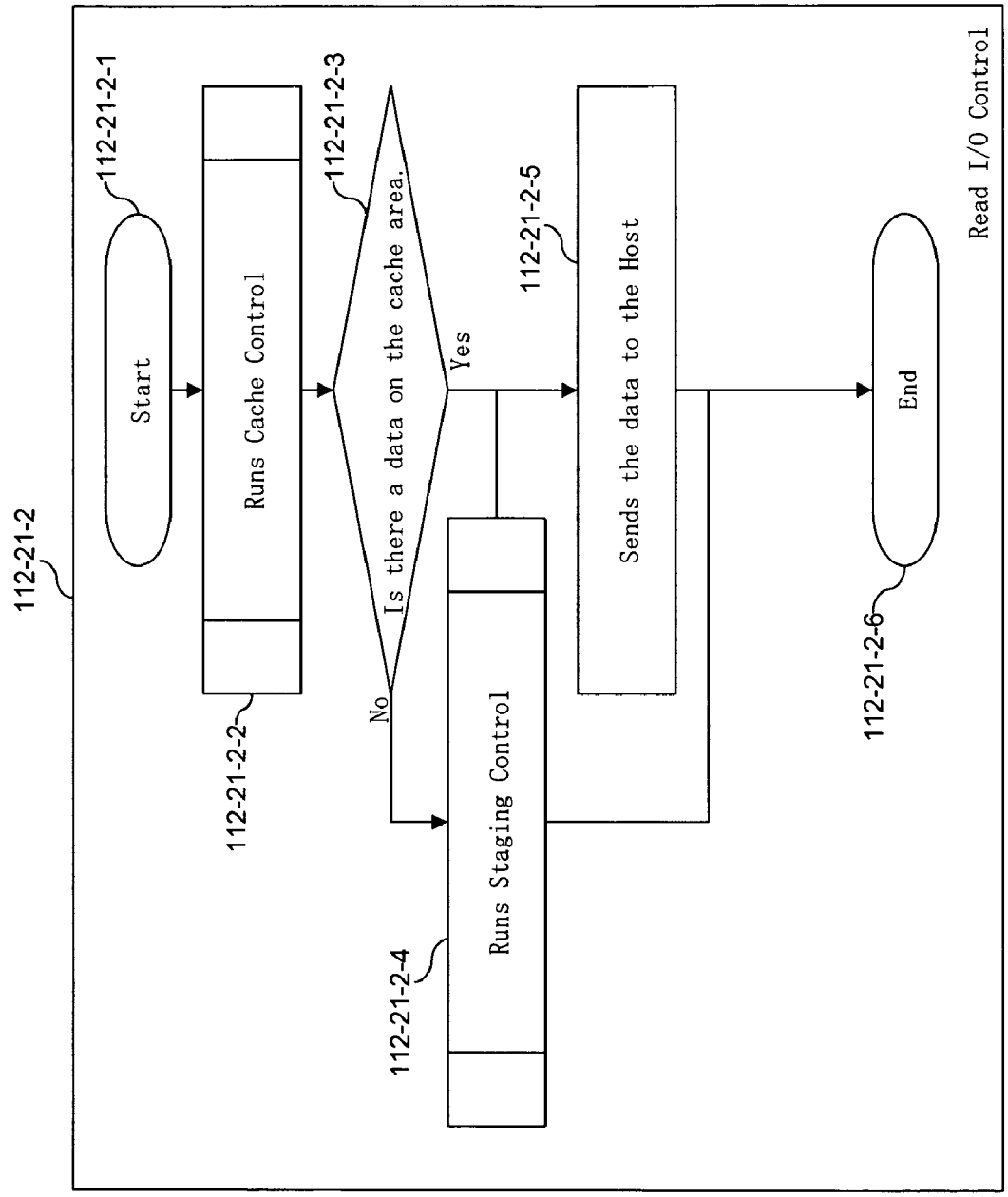
FIG. 12 illustrates an example of a process flow of the Read I/O Control in FIG. 3.

FIG. 12 illustrates an example of a process flow of the Read I/O Control 112-21-2. This program is run when a read I/O request occurs or another program calls. To start the process (112-21-2-1), the CPU 111 calls the Cache Control 112-24 to find or allocate the cache area (step 112-21-2-2). The CPU 111 determines whether it needs to stage the data to the cache area or not (step 112-21-2-3). If staging is needed, the CPU 111 calls the Staging Control 112-22-1 (step 112-21-2-4). If staging is not needed, the CPU 111 sends the data from the cache area to the host 112-30 (step 112-21-2-5), and the process ends (112-21-2-6).

Figure 13:
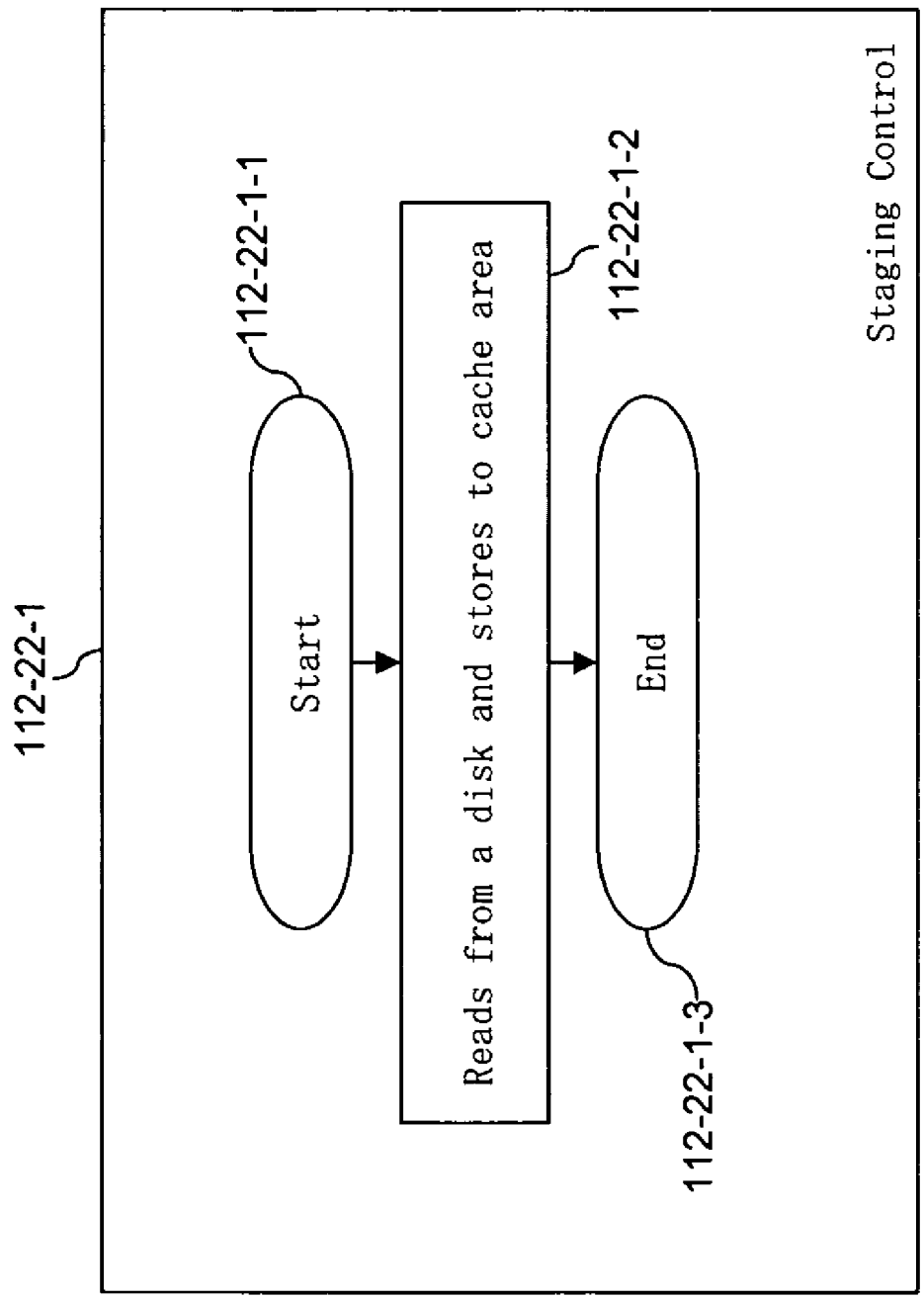
FIG. 13 illustrates an example of a process flow of the Staging Control in FIG. 3.

FIG. 13 illustrates an example of a process flow of the Staging Control 112-22-1. To start the process (112-22-1-1), the CPU 111 reads data from the disks 121 and stores to the cache area 112-30 (step 112-22-1-2), and the process ends (112-22-1-3).

Figure 14:
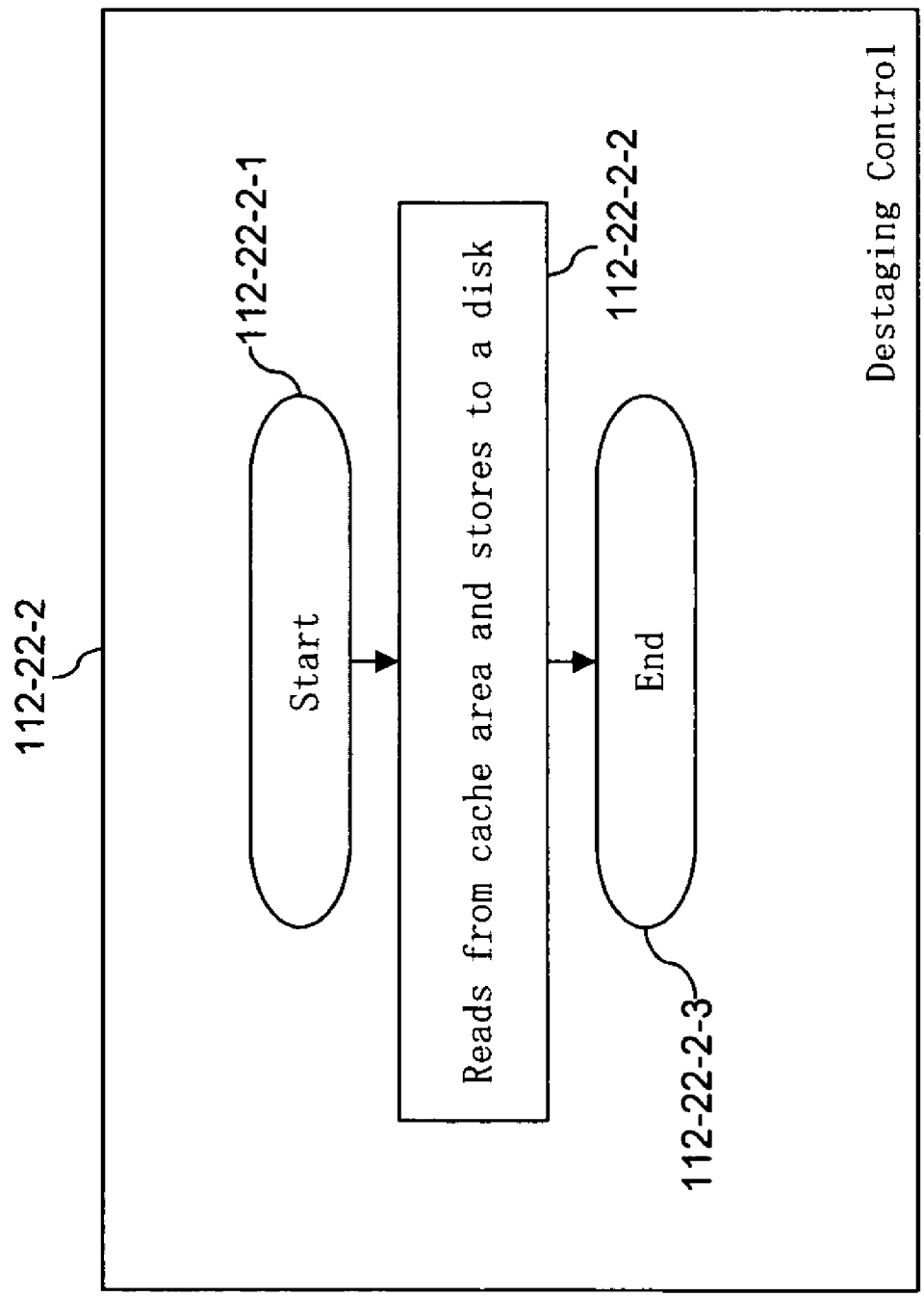
FIG. 14 illustrates an example of a process flow of the Destaging Control in FIG. 3.

FIG. 14 illustrates an example of a process flow of the Destaging Control 112-22-2. To start the process (112-22-2-1), the CPU 111 reads data from the cache area 112-30 and stores to the disks 121 (step 112-22-2-2), and the process ends (112-22-2-3).

Figure 15:
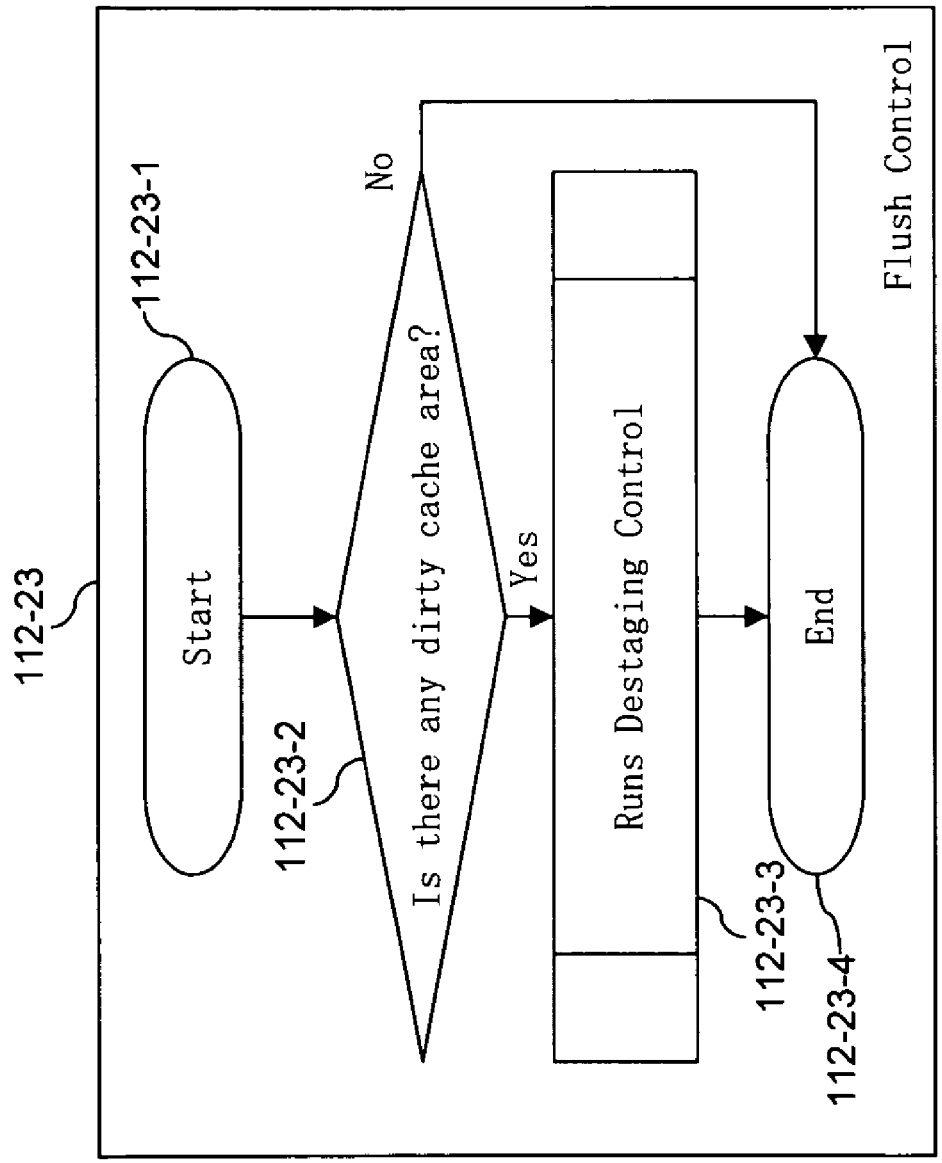
FIG. 15 illustrates an example of a process flow of the Flush Control in FIG. 3.

FIG. 15 illustrates an example of a process flow of the Flush Control 112-23. This program is periodically run. To start the process (112-23-1), the CPU 111 checks the Cache Management Table 112-14 and searches for dirty data (step 112-23-2). If there is dirty data, the CPU 111 calls the Destaging Control 112-22-2 (step 112-23-3). If not, the process ends (112-23-4).

Figure 16:
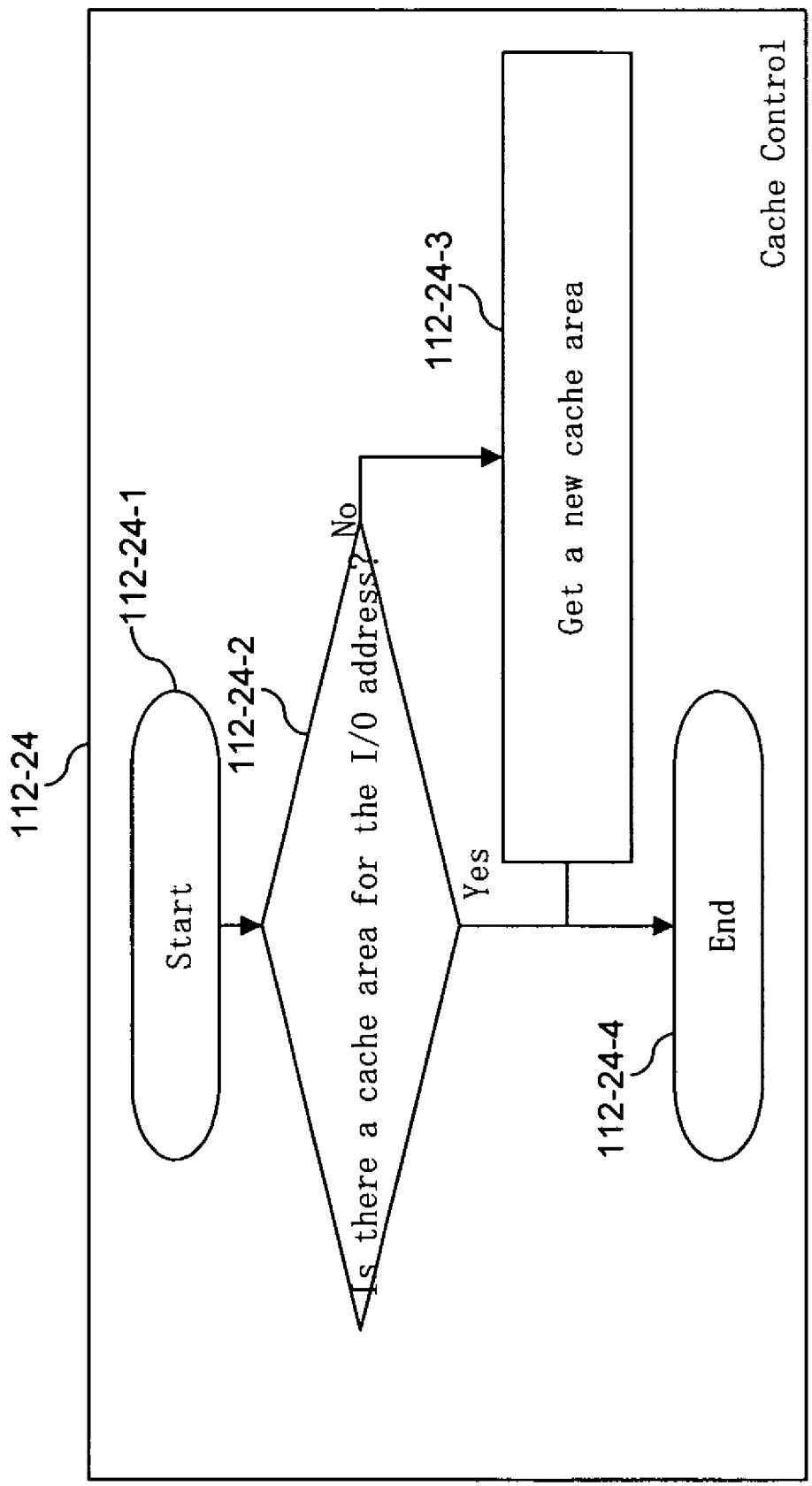
FIG. 16 illustrates an example of a process flow of the Cache Control in FIG. 3.

FIG. 16 illustrates an example of a process flow of the Cache Control 112-24. To start the process (112-24-1), the CPU 111 searches for a cache slot of designated volume and address (step 112-24-2). If there is no cache slot, the CPU 111 allocates a new cache slot from a free or clean cache area (step 112-24-3). Otherwise, the process ends (112-24-4).

Figure 17:
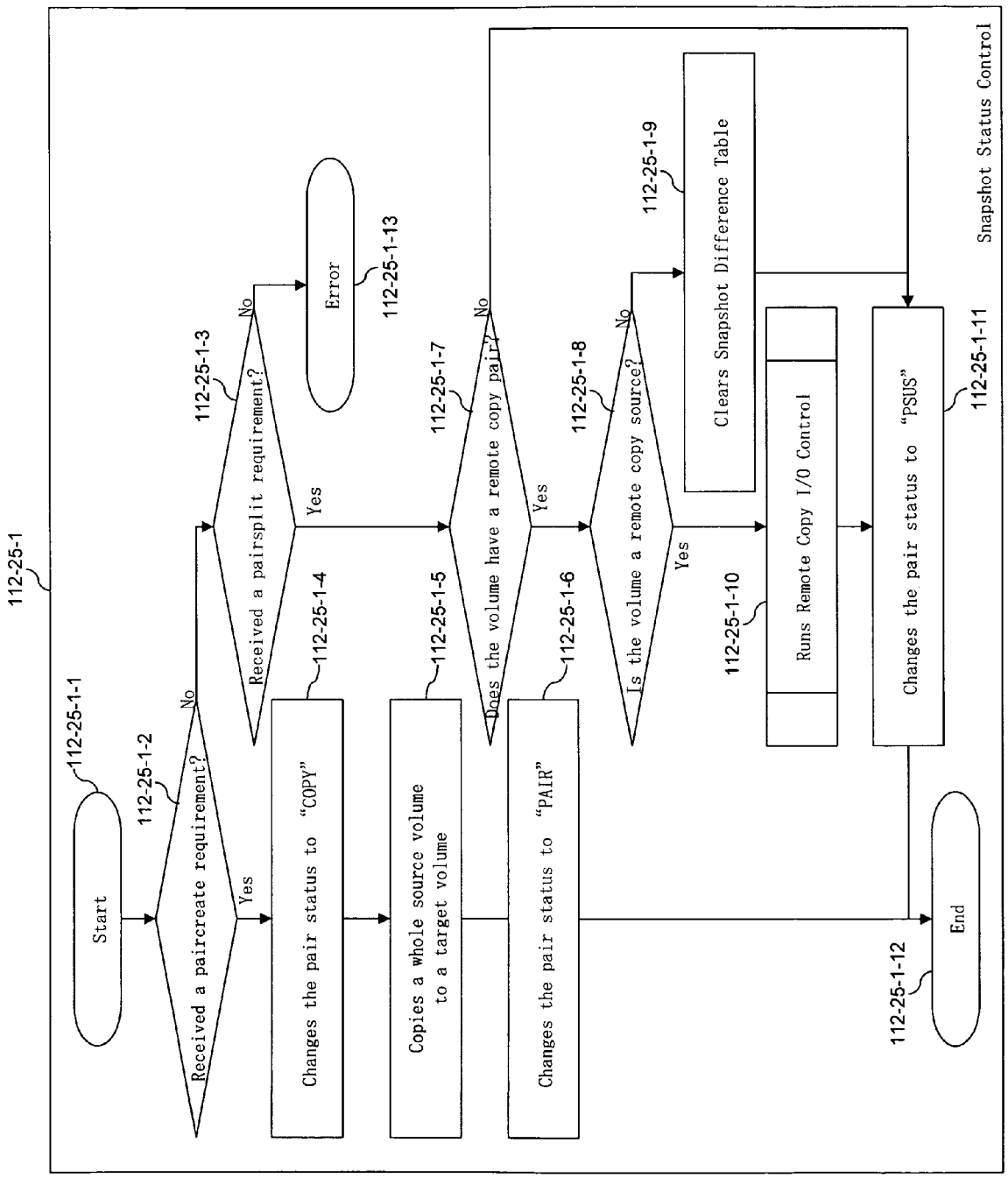
FIG. 17 illustrates an example of a process flow of the Snapshot Status Control in FIG. 3.

FIG. 17 illustrates an example of a process flow of the Snapshot Status Control 112-25-1. This program is run when a snapshot pair operation request occurs. To start the process (112-25-1-1), the CPU 111 distinguishes and identifies the kind of snapshot pair operation by asking whether the subsystem received a paircreate requirement (step 112-25-1-2) and whether it received a pairsplit requirement (step 112-15-1-3). If it received a paircreate requirement, the CPU 111 changes the snapshot pair status 112-15-1-2 to "COPY" (step 112-25-1-4), copies the source volume to the target volumes of the pair (step 112-25-1-5), and changes the snapshot pair status 112-15-1-2 to "PAIR" (step 112-25-1-6). If it received a pairsplit requirement, the CPU 111 determines whether the volume has a remote copy pair by checking the Remote Copy Pair Management Table 112-16-1 (step 112-25-1-7). If the volume has a remote copy pair, the CPU 111 checks the remote copy volume status to determine whether it is source or target (step 112-25-1-8). If the volume is not a remote copy source, the CPU 111 clears the Snapshot Difference Table 112-15-2 to all "Unchanged" (step 112-25-1-9). If the volume is a remote copy source, the CPU 111 calls the Remote Copy I/O Control 112-26-2 to transfer the snapshot pairsplit request to a remote storage subsystem (step 112-25-1-10), and changes the snapshot pair status 112-15-1-2 to "PSUS" (step 112-25-1-11). If the volume does not have a remote copy pair in step 112-25-1-7, the CPU 111 also changes the snapshot pair status 112-15-1-2 to "PSUS" (step 112-25-1-11), and the process ends (112-25-1-12).

Figure 18:
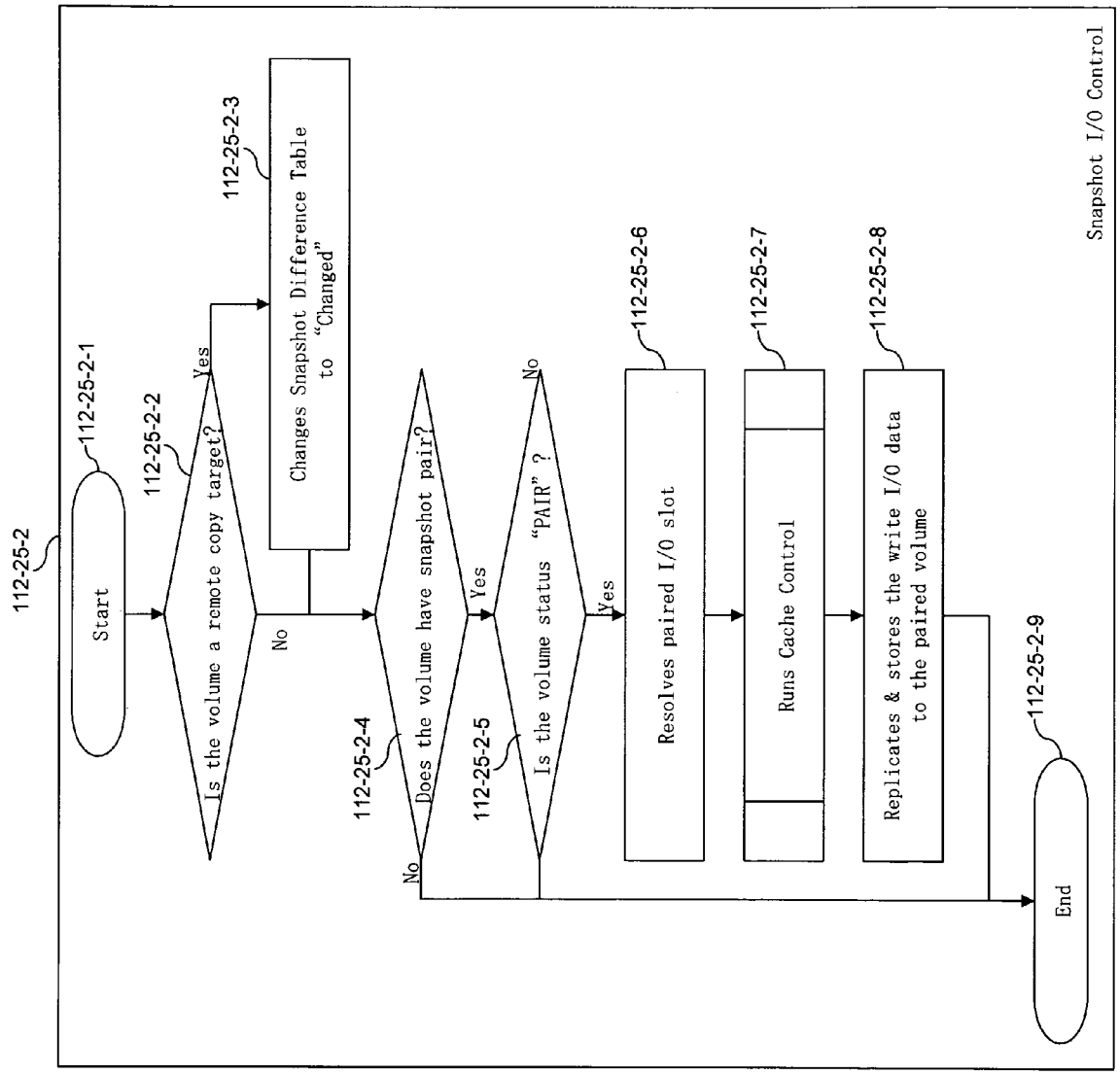
FIG. 18 illustrates an example of a process flow of the Snapshot I/O Control in FIG. 3.

FIG. 18 illustrates an example of a process flow of the Snapshot I/O Control 112-25-2. To start the process (112-25-2-1), the CPU 111 determines whether the designated volume is a remote copy target by checking the Remote Copy Pair Management Table 112-16-1 (step 112-25-2-2). If the volume is a remote copy target, the CPU 111 changes the status 112-15-2-2 of the designated address to "Changed" (step 112-25-2-3). If the volume is not a remote copy target, the CPU 111 determines whether the designated volume belongs to some snapshot pair by checking the Snapshot Pair Management Table 112-15-1 (step 112-25-2-4). If not, the process ends (112-25-2-9). If there is a snapshot pair, the CPU 111 checks the pair status to determine whether the status is "PAIR" (step 112-25-2-5). If not, the process ends (112-25-2-9). If the status is "PAIR," the CPU 111 resolves the I/O slot to make replication volume (step 112-25-2-6), calls the Cache Control 112-24 to search or allocate a cache area (step 112-

25-2-7), and replicates a write I/O data and stores to the replication volume (step 112-25-2-8).

Figure 19:
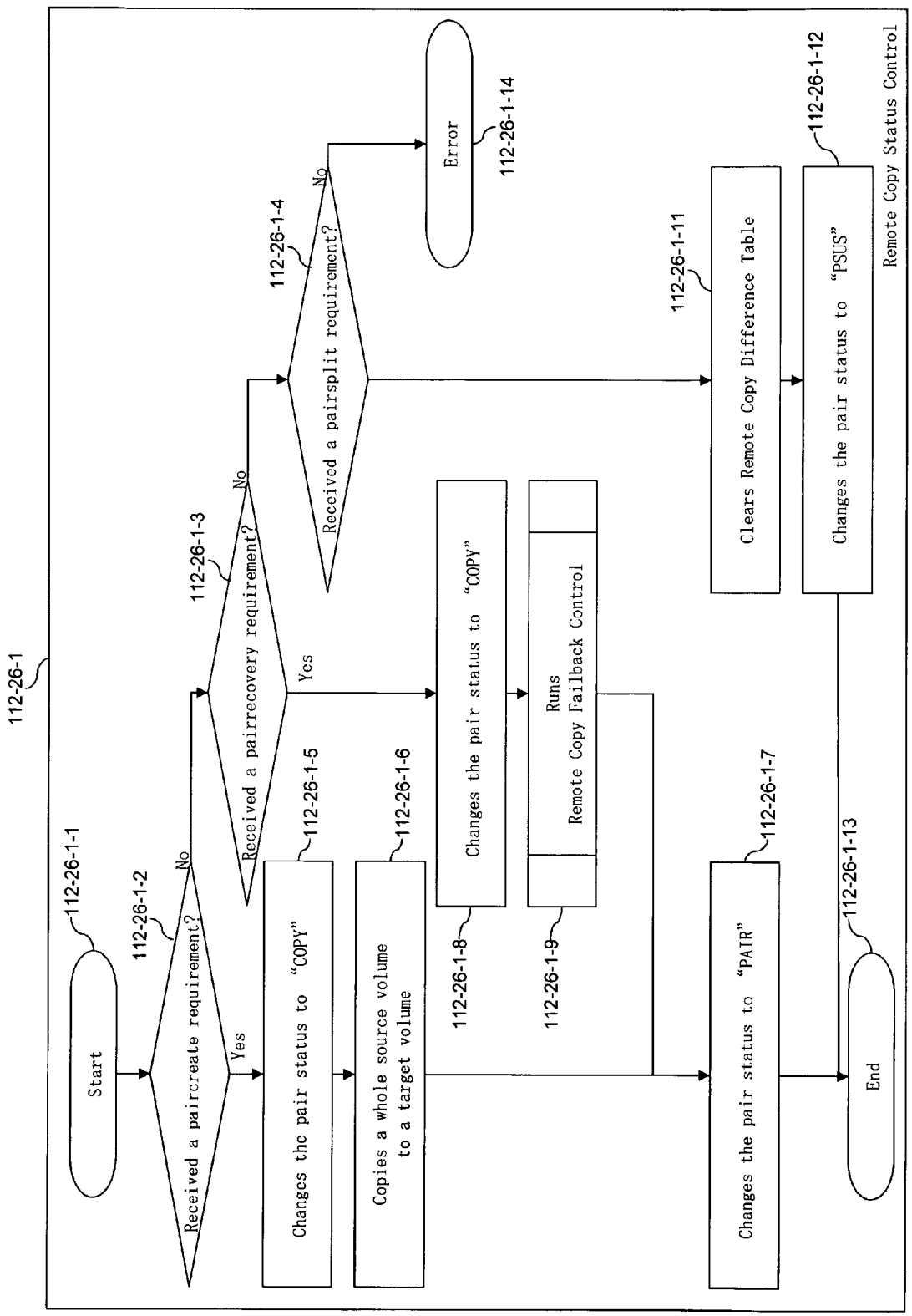
FIG. 19 illustrates an example of a process flow of the Remote Copy Status Control in FIG. 3.

FIG. 19 illustrates an example of a process flow of the Remote Copy Status Control 112-26-1. To start the process (112-26-1-1), the CPU 111 identifies the kind of remote copy pair operation by asking whether the subsystem received a paircreate requirement (step 112-26-1-2), whether it received a pairrecovery requirement (step 112-26-1-3), and whether it received a pairsplit requirement (step 112-26-1-4). If it received a paircreate requirement, the CPU 111 changes the remote copy pair status 112-16-1-2 to "COPY" (step 112-26-1-5), copies the source volume to the target volumes of the pair between the local and remote storage subsystems (step 112-26-1-6), and changes the Remote Copy Pair Status 112-16-1-2 to "PAIR" (step 112-26-1-7). If it received a pair recovery requirement, the CPU 111 changes the remote copy pair status 112-16-1-2 to "COPY" (step 112-26-1-8), calls the Remote Copy Failback Control 112-264 (step 112-26-1-9), and changes the remote copy pair status 112-16-1-2 to "PAIR" (step 112-26-1-7). If it received a pairsplit requirement, the CPU 111 clears Remote Copy Difference Table 112-16-2 to all "Unchanged" (step 112-26-1-11), and changes the Remote Copy Pair Status 112-16-1-2 to "PSUS" (step 112-26-1-12). The process ends (112-26-1-13). If none of the above applies, there is an error (112-26-1-14).

Figure 20:
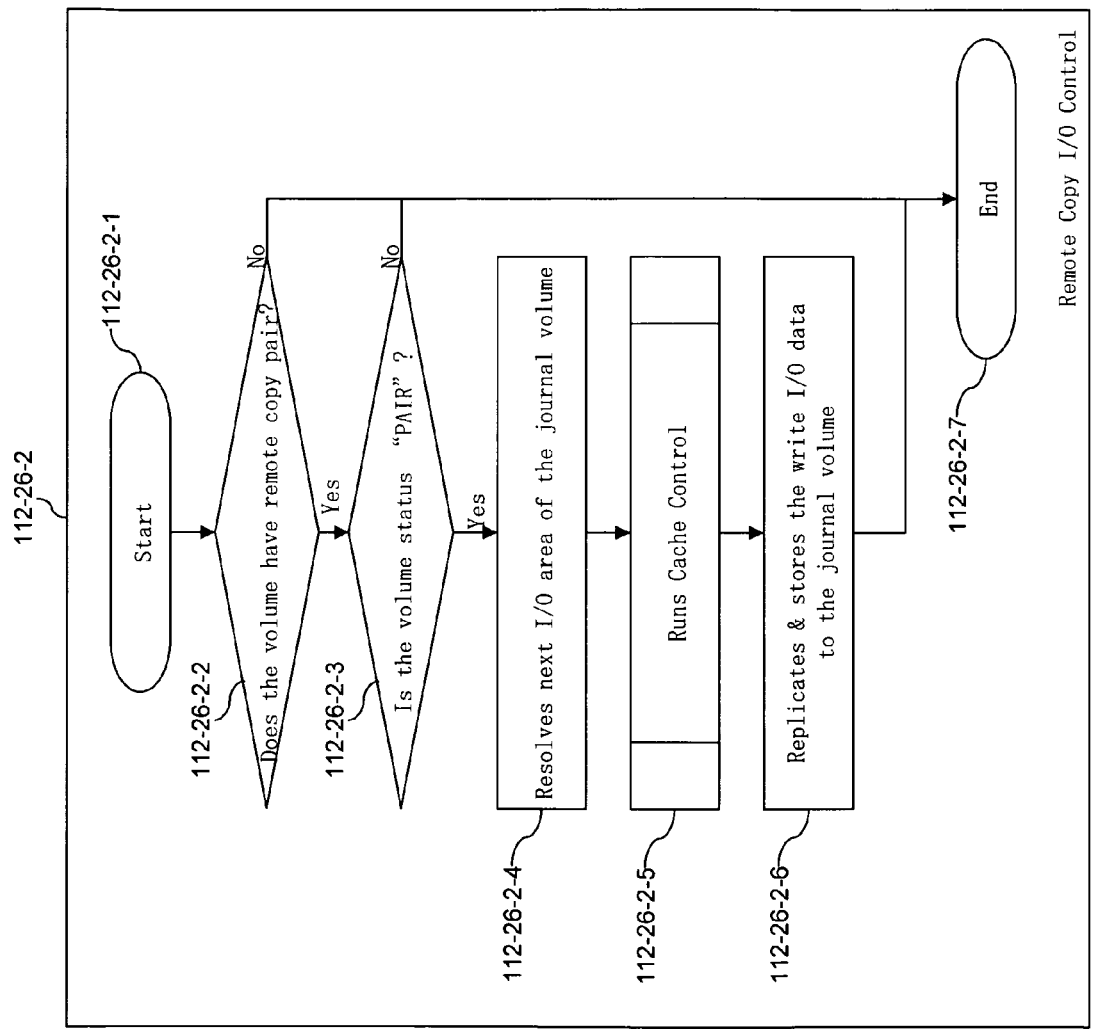
FIG. 20 illustrates an example of a process flow of the Remote Copy I/O Control in FIG. 3.

FIG. 20 illustrates an example of a process flow of the Remote Copy I/O Control 112-26-2. To start the process (112-26-2-1), the CPU 111 determines whether the designated volume belongs to some remote pair by checking the Remote Copy Pair Management Table 112-16-1 (step 112-26-2-2). If not, the process ends (112-26-2-7). If there is a remote copy pair, the CPU 111 checks the pair status to determine whether it is "PAIR" (step 112-26-2-3). If not, the process ends (112-26-2-7). If there is "PAIR" status, the CPU 111 resolves the next I/O slot in the journal volume (step 112-26-2-4), calls the Cache Control 112-24 to search or allocate a new slot for the journal data (step 112-26-2-5), and replicates a write I/O data and stores to the journal volume (step 112-26-2-6).

Figure 21:
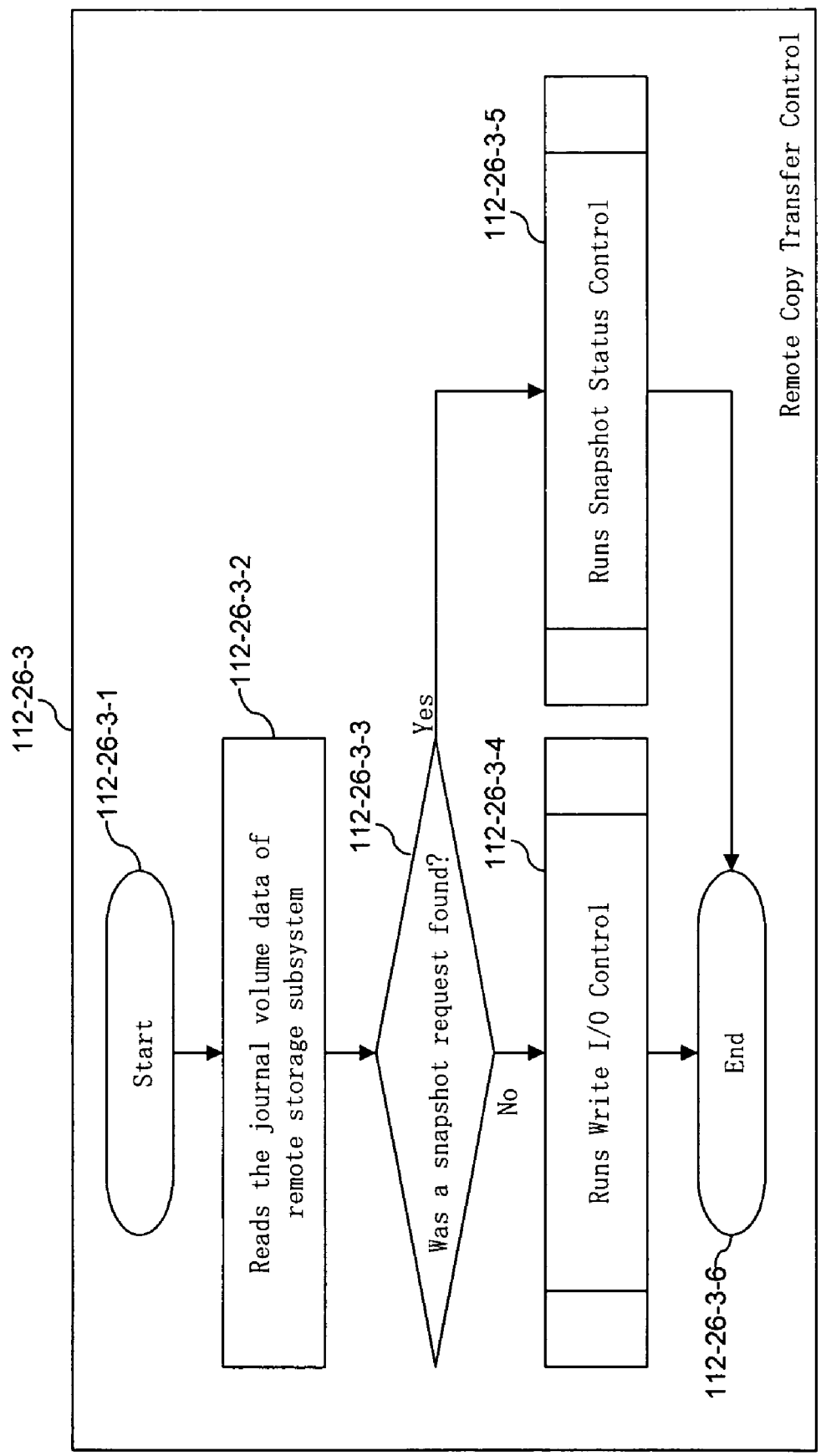
FIG. 21 illustrates an example of a process flow of the Remote Copy Transfer Control in FIG. 3.

FIG. 21 illustrates an example of a process flow of the Remote Copy Transfer Control 112-26-3. This program is periodically run. To start the process (112-26-3-1), the CPU 111 sends a read I/O to a journal volume in the other storage subsystem and receives the data (step 112-26-3-2). The CPU 111 reads the header area of the received data and checks to determine whether it stores a snapshot request ("pairsplit") (step 112-26-3-3). If not, the CPU 111 calls the Write I/O Control 112-21-1 to store the data in the data area of the received data (step 112-26-3-4). If there is a snapshot request, the CPU 111 calls the Snapshot Status Control 112-25-1 to change the snapshot pair status (step 112-26-3-5). The process ends (112-26-3-6).

Figure 22:
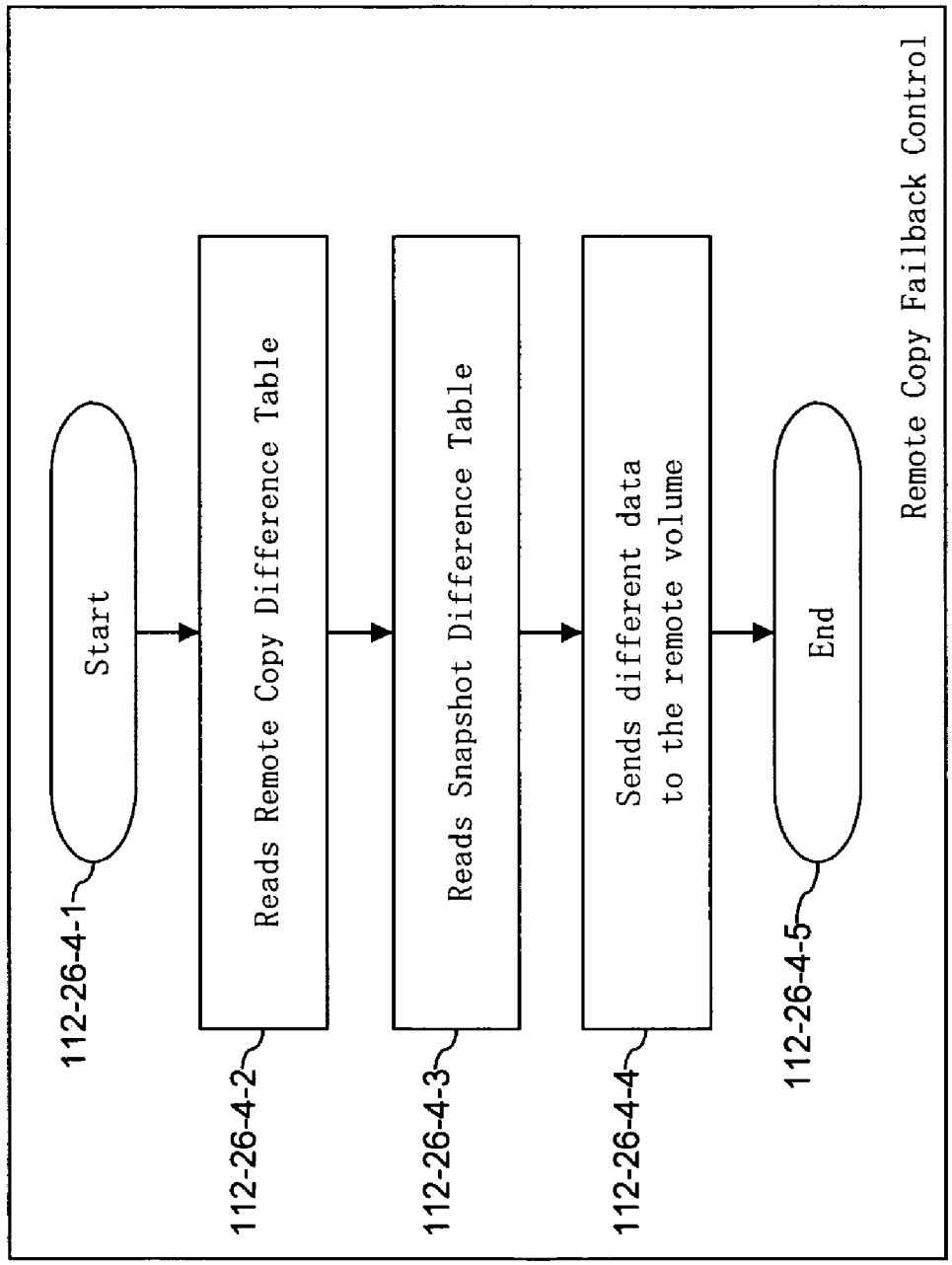
FIG. 22 illustrates an example of a process flow of the Remote Copy Failback Control in FIG. 3.

FIG. 22 illustrates an example of a process flow of the Remote Copy Failback Control 112-26-4. To start the process (112-26-4-1), the CPU 111 reads the Remote Copy Difference Table 112-16-2 (step 112-264-2), reads the Snapshot Difference Table 112-15-2 (step 112-26-4-3), and sends data from the target volume to the source volume (step 112-26-4-4). The process ends (112-26-4-5). In this process, the data area is only "Changed" area of the Remote Copy Difference Table 112-16-2 or the Snapshot Difference Table 112-15-2.

Figure 23:
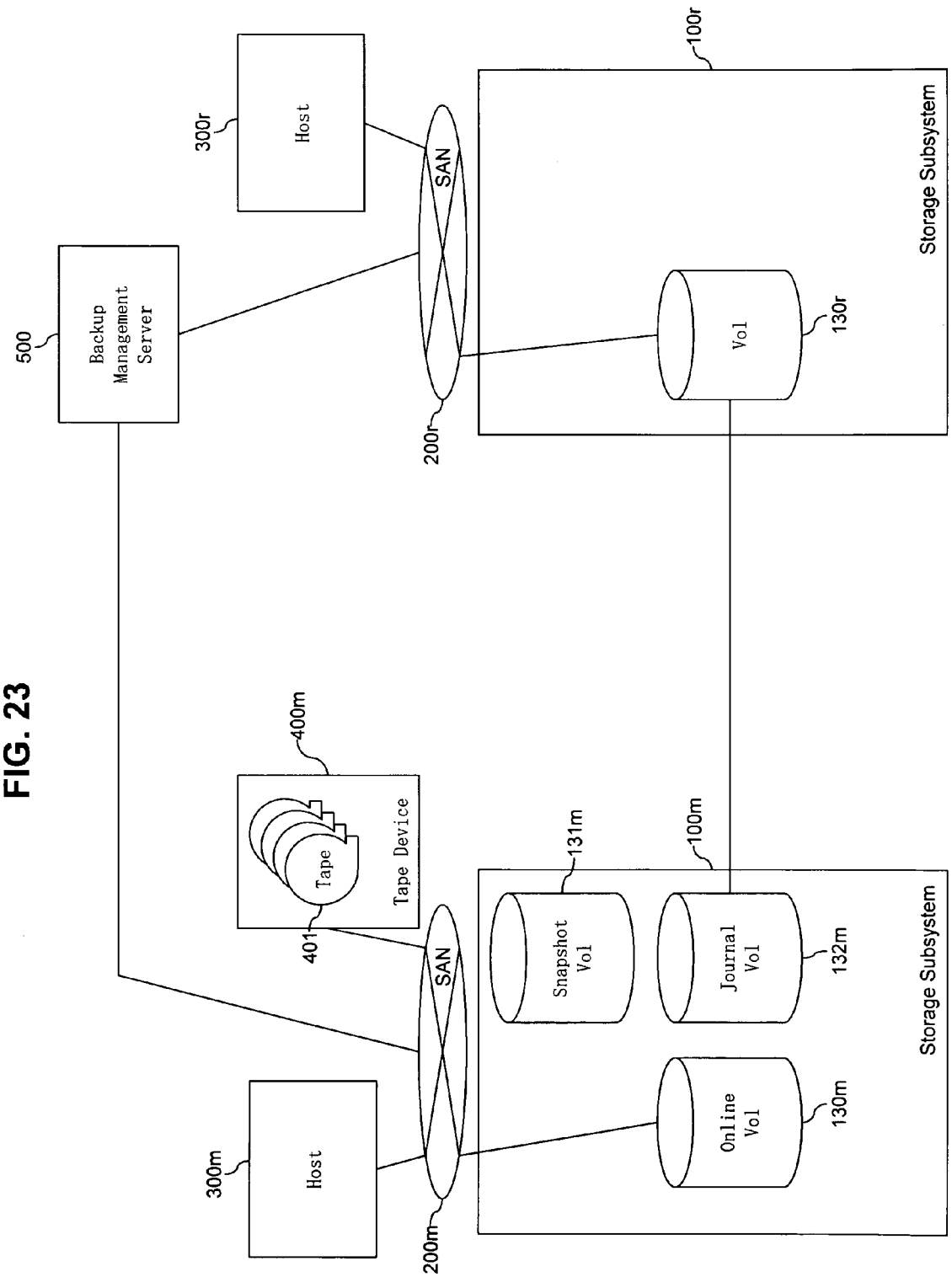
FIG. 23 illustrates an exemplary logical structure of the system shown in FIG. 1 in which the method and apparatus of the invention may be applied.

FIG. 23 illustrates an exemplary logical structure of the system shown in FIG. 1 in which the method and apparatus of the invention may be applied. The first storage subsystem 100m includes logical volumes 130m, 131m, and 132m. The logical volume 130m is an online volume accessed from the first host computer 300m. The logical volume 131m is a backup or a snapshot volume for the logical volume 130m. The logical volume 132m is a repository or journal volume for write I/O to the logical volume 130m. The second storage subsystem 100r has a logical volume 130r which is a remote copy target volume for the logical volume 130m.

Figure 23A:
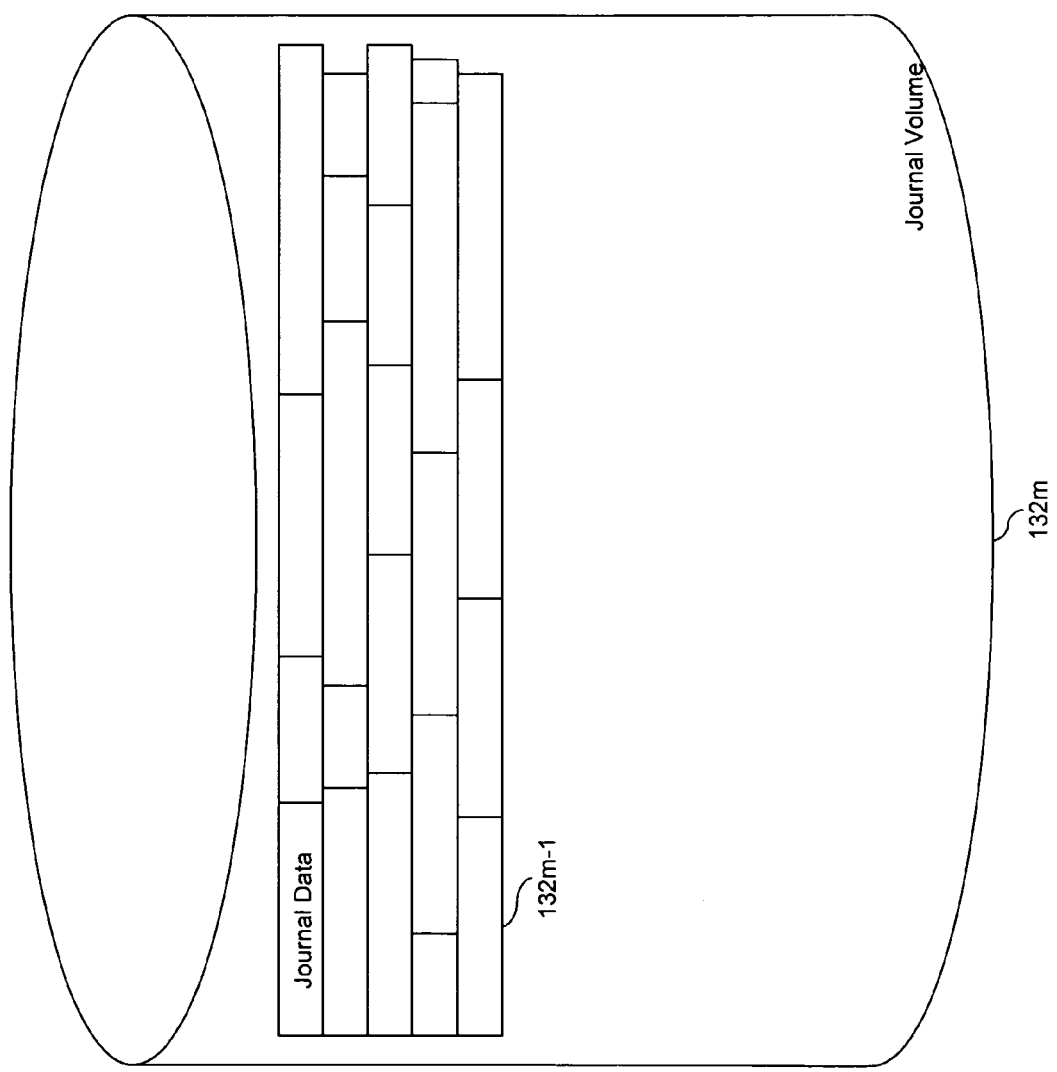
FIG. 23A illustrates an example of the structure of a journal volume.
Figure 23B:
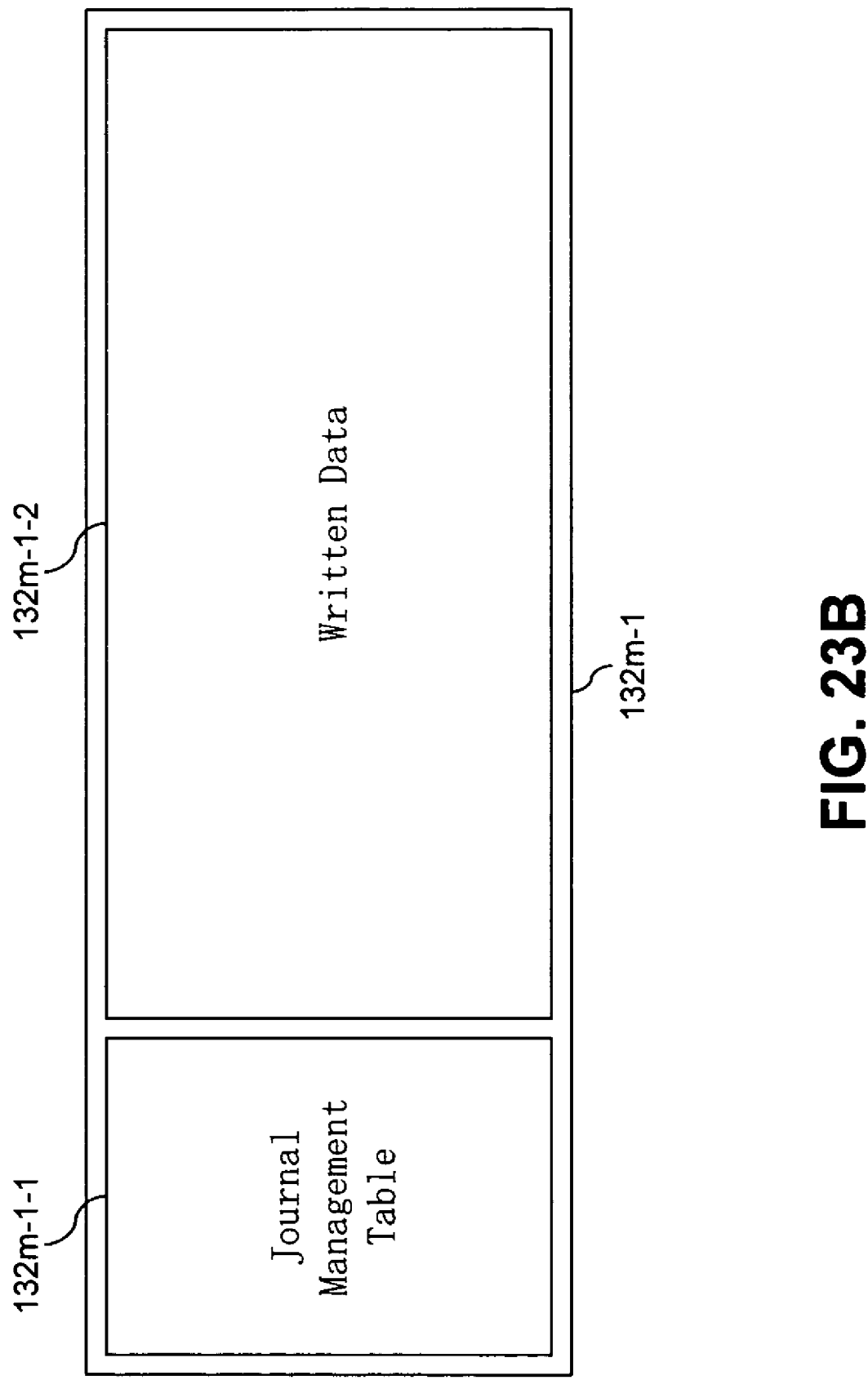
FIG. 23B illustrates an example of the structure of journal data in the journal volume of FIG. 23A.

FIG. 23A illustrates an example of the structure of a journal volume 132m, which stores journal data 132m-1 in a manner that is consistent with the write I/O sequence. FIG. 23B illustrates an example of the structure of journal data 132m-1 in the journal volume 132m of FIG. 23A. The journal data 132m-1 includes Journal Management Table 132m-1-1 and written data 132m-1-2. The Journal Management Table 132m-1-1 manages the written data 132m-1-2. The written data 132m-1-2 is the write I/O data received from the host 300m. The size of the Journal Management Table 132m-1-1 is fixed, but the written data 132m-1-2 is variable.

Figure 24:
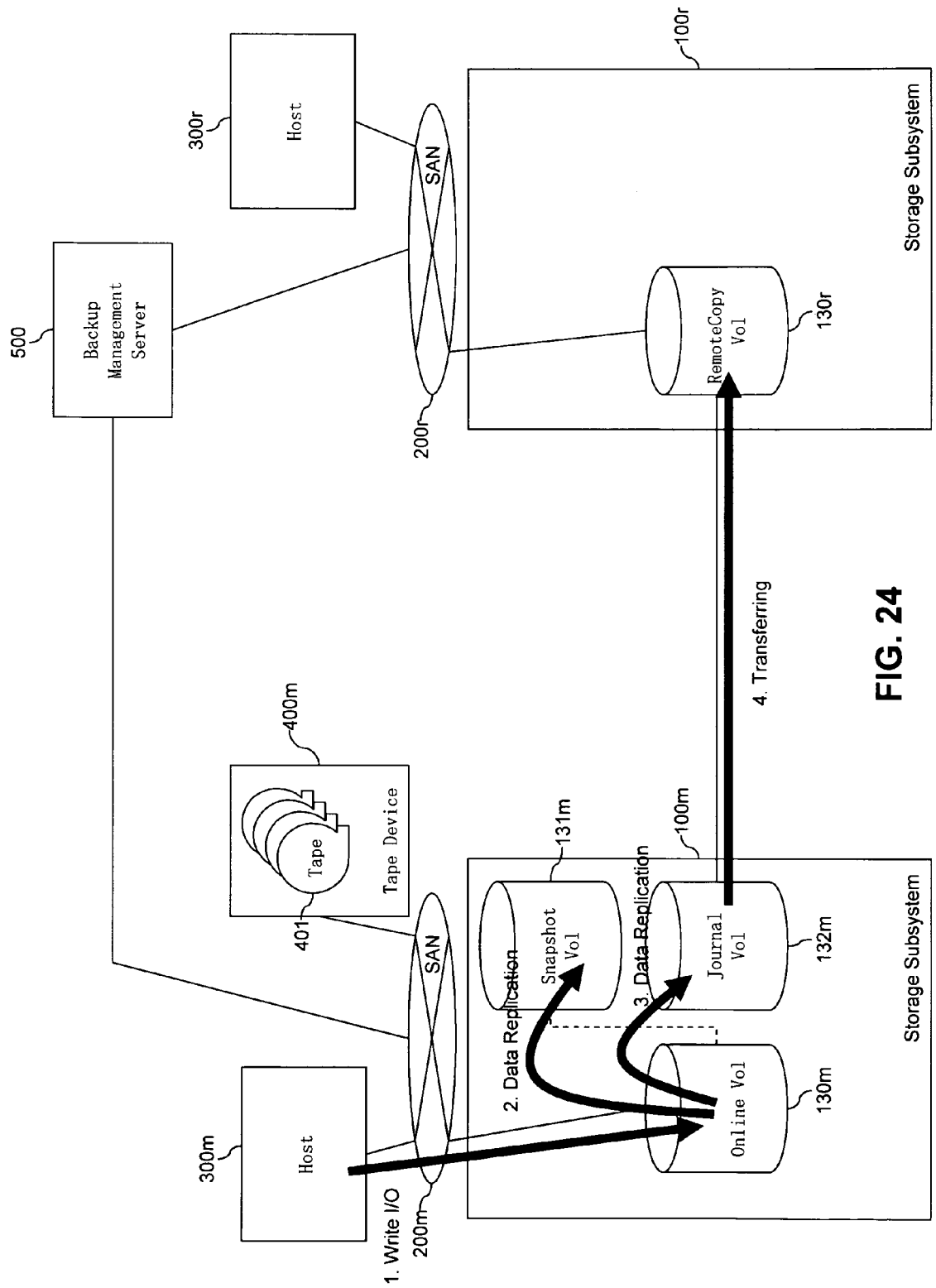
FIG. 24 illustrates an example of a write I/O data flow in the snapshot and remote copy environment.

FIG. 24 illustrates an example of a write I/O data flow in the snapshot and remote copy environment. The first host computer 300m initiates access to the logical volume 130m. The first storage subsystem 100m replicates the write I/O to the snapshot volume 131m. The first storage subsystem 100m further replicates the write I/O and stores it and the control information to the journal volume 132m in order. The second storage subsystem 100r reads the journal volume 132m. First, the second storage subsystem 100r checks the control information and determines the I/O address. Next, the second storage subsystem 100r stores the write I/O data to the determined I/O address of the remote copy volume 130r.

Figure 25:
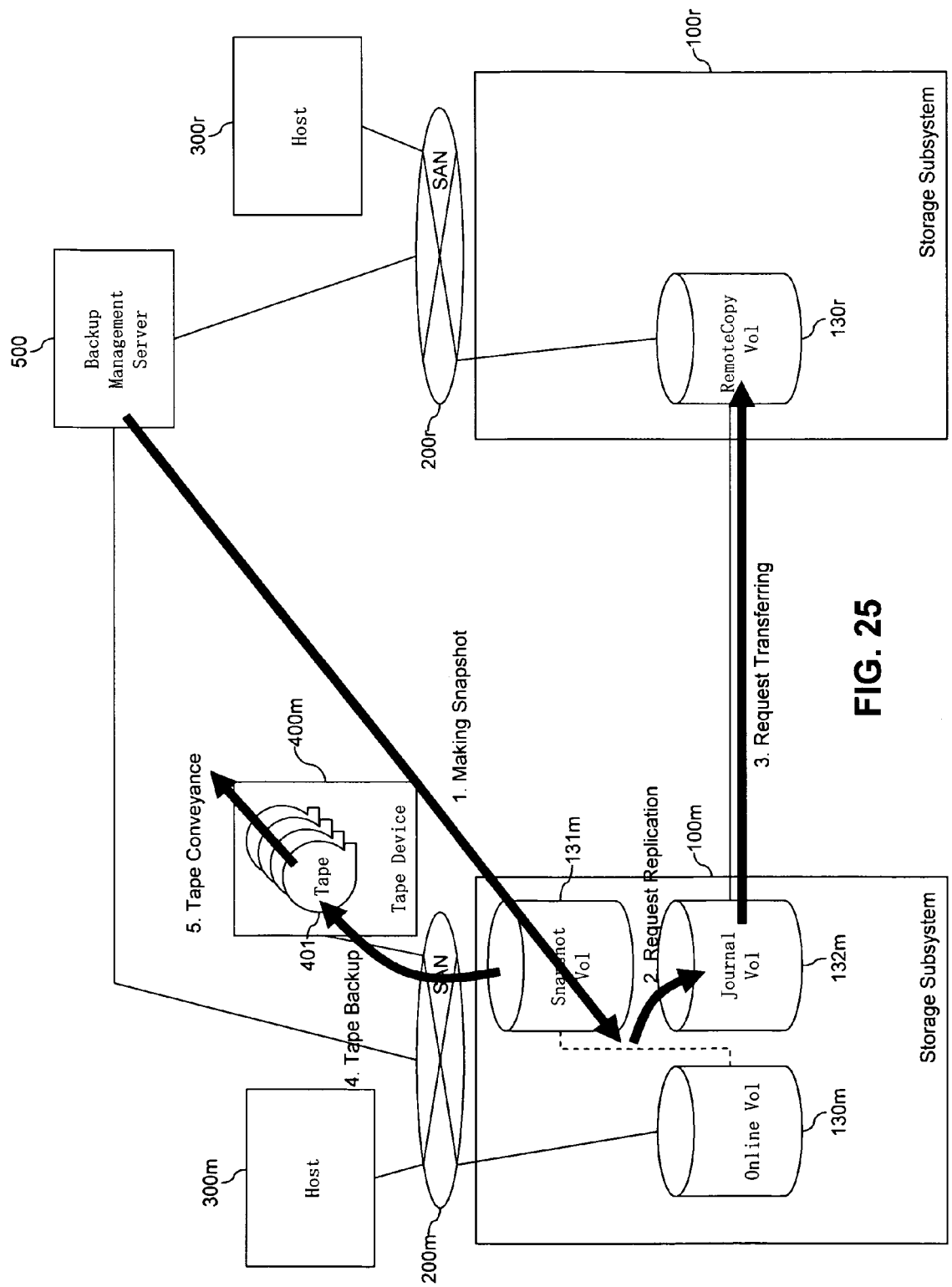
FIG. 25 illustrates an example of a process of a snapshot request and backup operation.

FIG. 25 illustrates an example of a process of a snapshot request and backup operation. The backup management server 500 sends a snapshot request to the first storage subsystem 100m. The first storage subsystem 100m changes the pair status between the logical volume 130m and the snapshot volume 131m. The first storage subsystem 100m further stores the snapshot request to the journal volume 132m in order in the same way as write I/Os. The second storage subsystem 100r reads the journal volume 132m. First, the second storage subsystem 100r checks the control information and finds the snapshot request. Next, the second storage subsystem 100r changes the status of the remote copy volume 130r and clears the Snapshot Difference Table 112-15-2. The backup management server 500 instructs the tape device 400m to backup from the snapshot volume 131m to the tape 401 and store the backup information. A user then withdraws the tape 401 and sends it to a warehouse.

Figure 26:
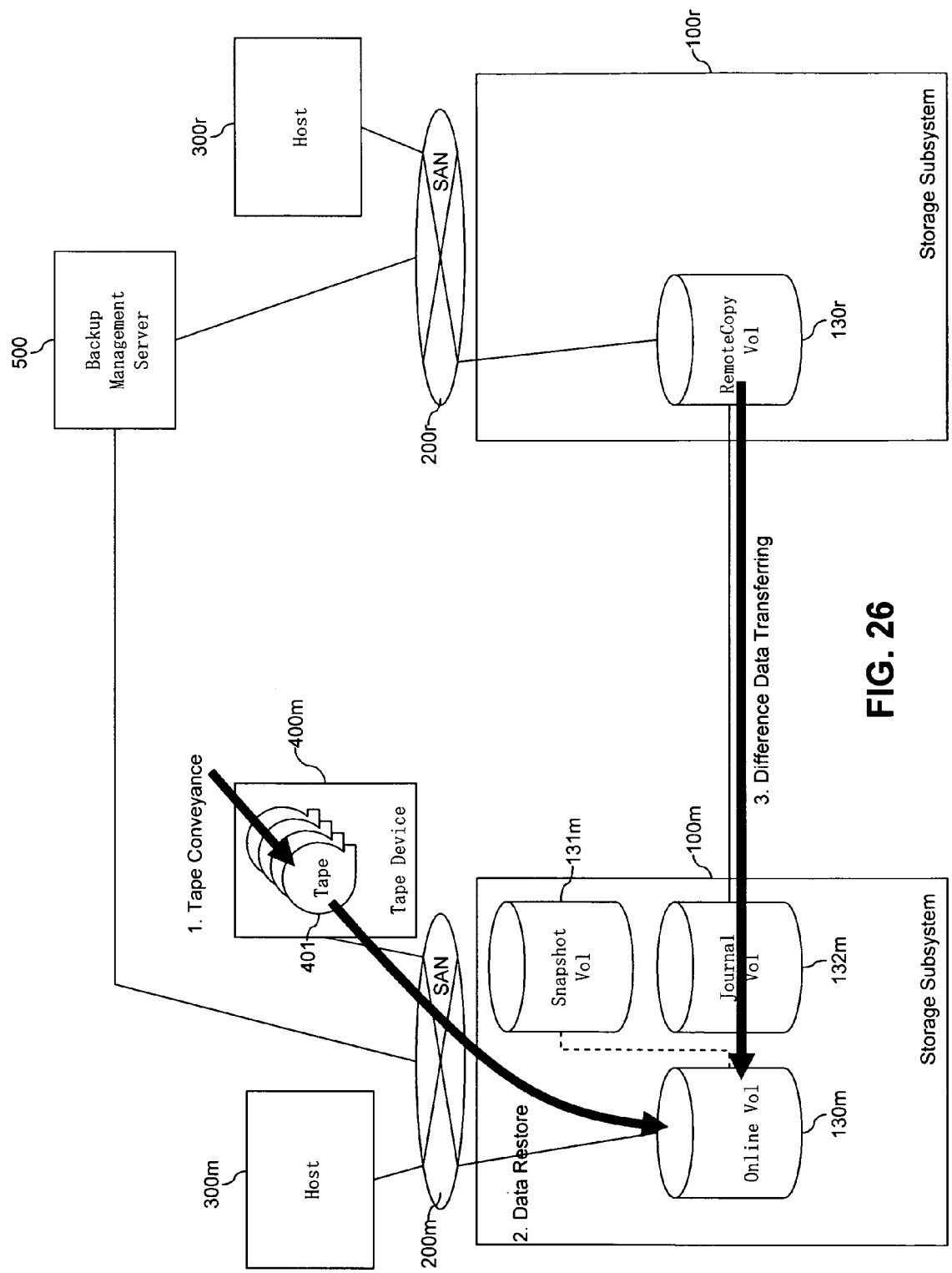
FIG. 26 illustrates an example of a process of a failback operation.

FIG. 26 illustrates an example of a process of a failback operation. A user sends the tape 401 from a warehouse and places it into the tape device 400m. The backup management server 500 instructs the tape device 400m to restore data from the tape 401 to the snapshot volume 131m and instructs the second storage subsystem 100r to restore the data from the remote copy volume 130r. The second storage subsystem 100r searches the different data area from the Snapshot Difference Table 112-15-2 and the Remote Copy Difference Table 112-16-2. Based on the restored snapshot data at a restored snapshot time from the tape 401 and the restored data from the remote copy volume 130r at a restoring time using the different data area determined from the Snapshot Difference Table 112-15-2 and the Remote Copy Difference Table 112-16-2, the second storage subsystem 100r then determines the difference data between the snapshot data at the restored snapshot time and the restored data at the restoring time, and sends the difference data from the remote copy volume 130r to the online volume 130m of the first storage subsystem. The low traffic failback operation is completed.

Second Embodiment

The second embodiment of the invention employs a second tape device for storing snapshot data from the second storage subsystem, and compares the snapshot data stored in the second tape device with data in the remote copy volume to determine the different data area instead of searching the Remote Copy Difference Table. The following describes the second embodiment focusing on the differences from the first embodiment.

Figure 27:
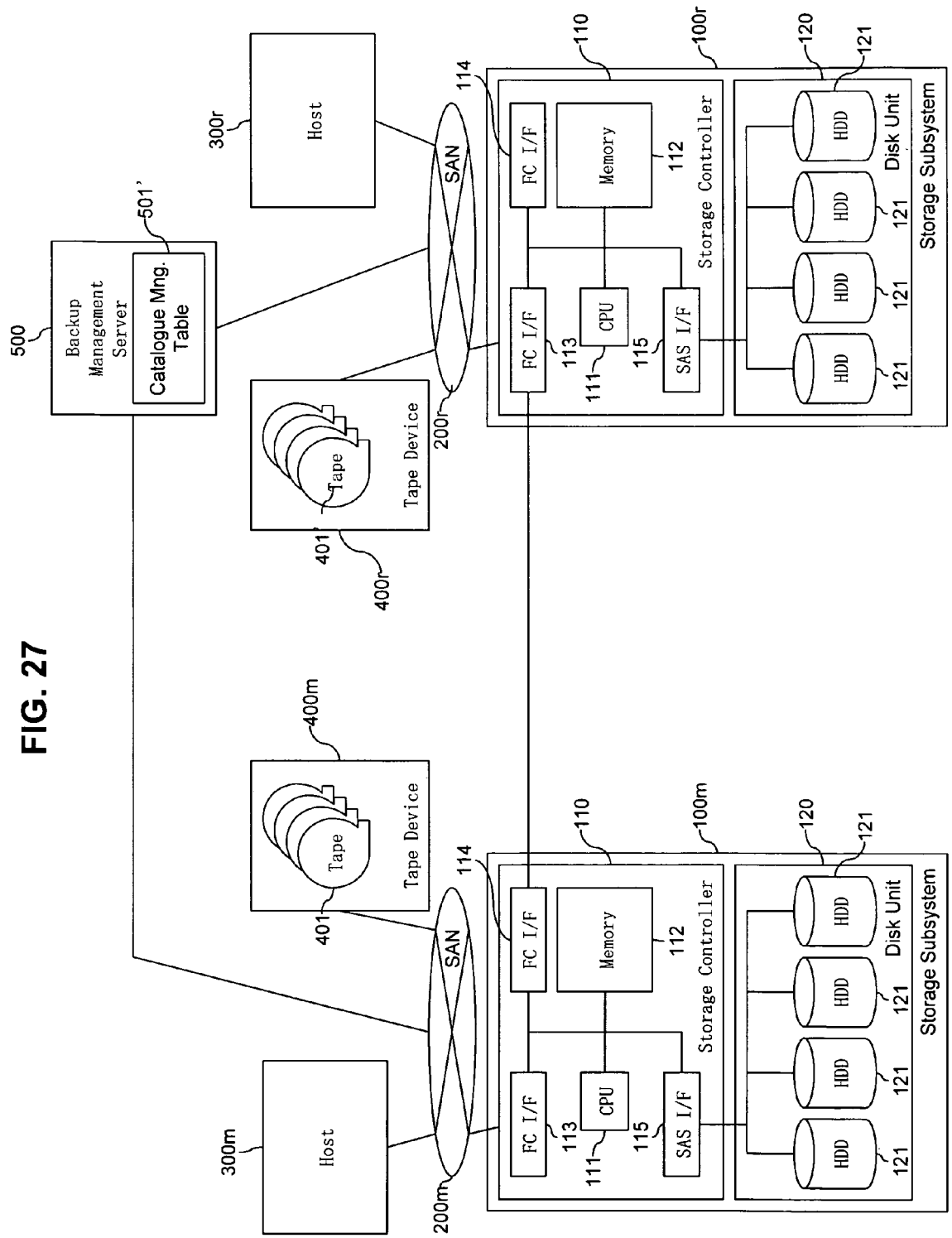
FIG. 27 illustrates the hardware configuration of a system according to a second embodiment in which the method and apparatus of the invention may be applied.

FIG. 27 illustrates the hardware configuration of a system according to a second embodiment in which the method and apparatus of the invention may be applied. As compared with the first embodiment of FIG. 1, the system of the second embodiment further includes a second tape device 400r which stores tapes 401' for storing data. The second tape device 400r is a remote tape device connected via the second network 200 r to the second storage subsystem 100r. The backup management server 500 manages the snapshot data in both tape devices 400m and 400r. The backup management server 500 includes a Catalogue Management Table 501'.

FIG. 28 illustrates an example of the Catalogue Management Table 501'. The remote copy volume number column 501'-1 lists the IDs of volumes in the second storage subsystem 100r. The generation number column 501'-2 lists the snapshot ID. The local backup tape number column 501'-3 lists the IDs of the tapes 401 in the first or local tape device 400m. The tapes 401 contain snapshot data of the first storage subsystem 100m. The remote backup tape number column 501'4 lists the IDs of the tapes 401' in the second or remote tape device 400r. The tapes 401' contains snapshot data of second storage subsystem 100r. Both tapes in the tape devices 400m and 400r will have the same data for a given backup time.

Figure 29:
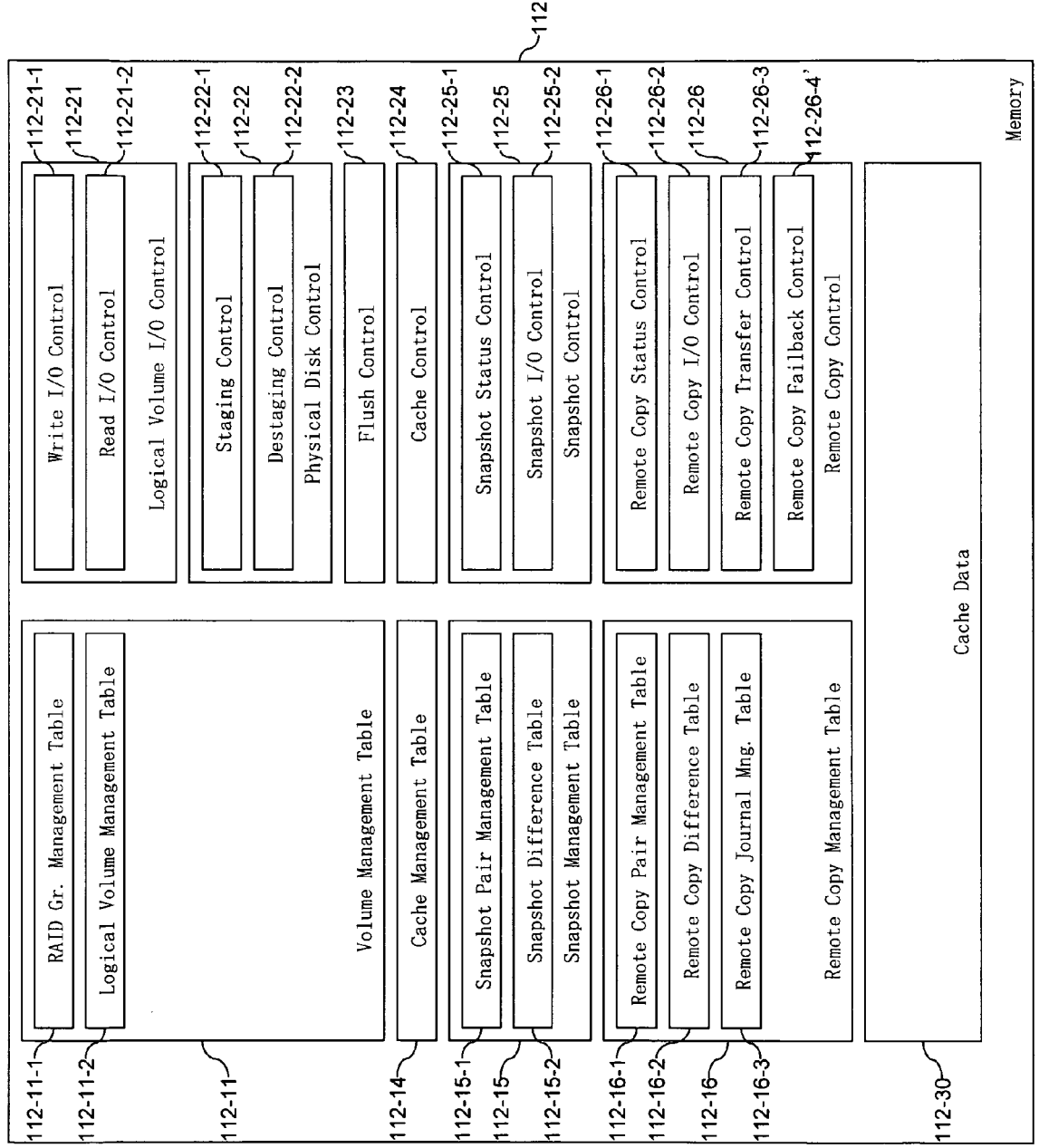
FIG. 29 illustrates an example of the memory in FIG. 27.

FIG. 29 illustrates an example of the memory 112. As compared with FIG. 3 of the first embodiment, the Remote Copy Failback Control 112-26-4' in the second embodiment finds the different data area by comparing the remote copy volumes 130r and the tapes 401' and writes the difference data from its own remote copy volumes to the online volumes of other storage subsystems.

Figure 30:
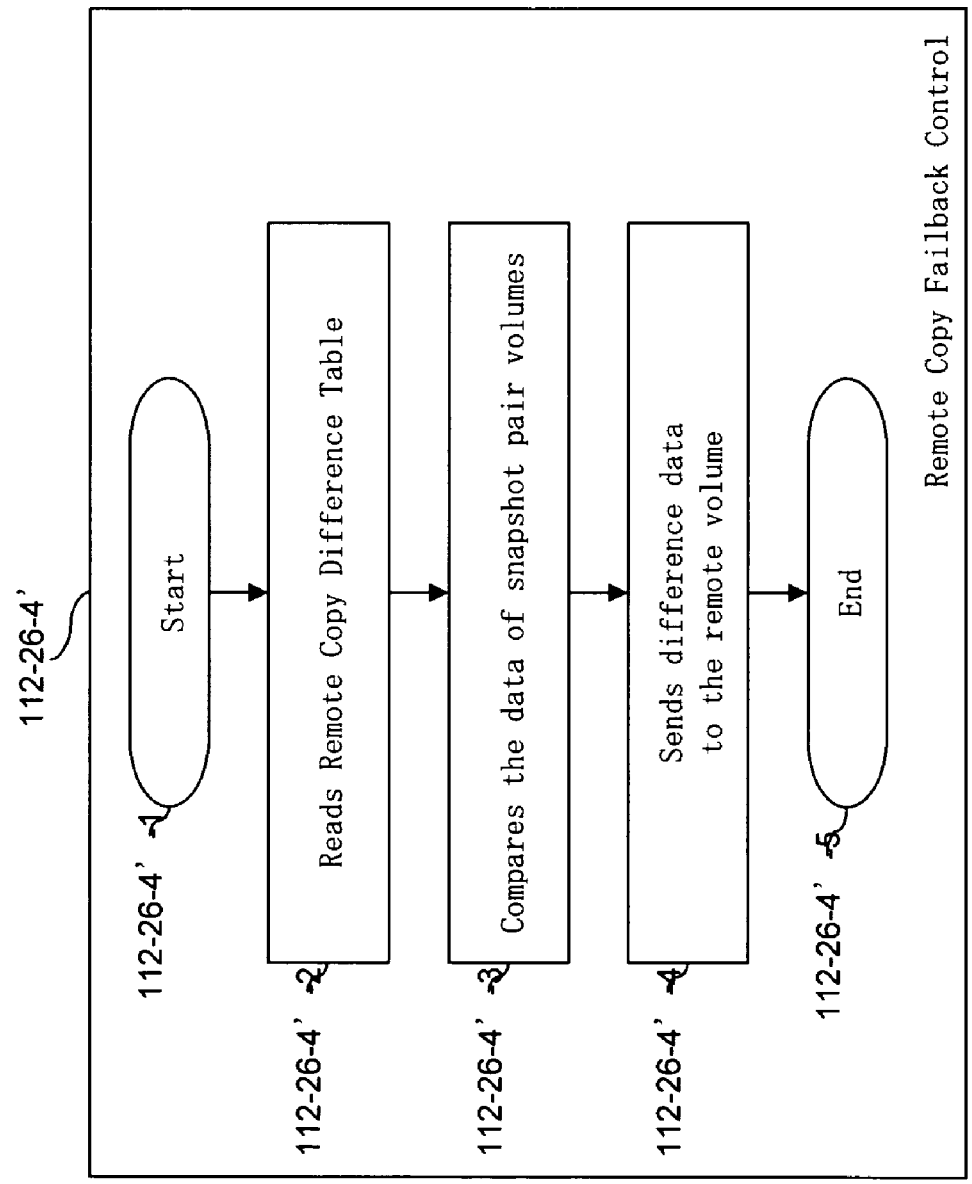
FIG. 30 illustrates an example of a process flow of the Remote Copy Failback Control in FIG. 29.

FIG. 30 illustrates an example of a process flow of the Remote Copy Failback Control 112-26-4'. To start the process (112-26-4'), the CPU 111 reads the Remote Copy Difference Table 112-16-2 (step 112-26-4'-2), reads the remote copy volume 130r and the snapshot volume 131r, compares both data, and finds the different data areas (step 112-26-4'-3), and sends data from the target volume to the source volume (step 112-26-4'-4). The process ends (112-26-4'-5). In this process, the data area is only "Changed" area of the Remote Copy Difference Table 112-16-2 or the found different data area between the snapshot volume and remote copy volume.

Figure 31:
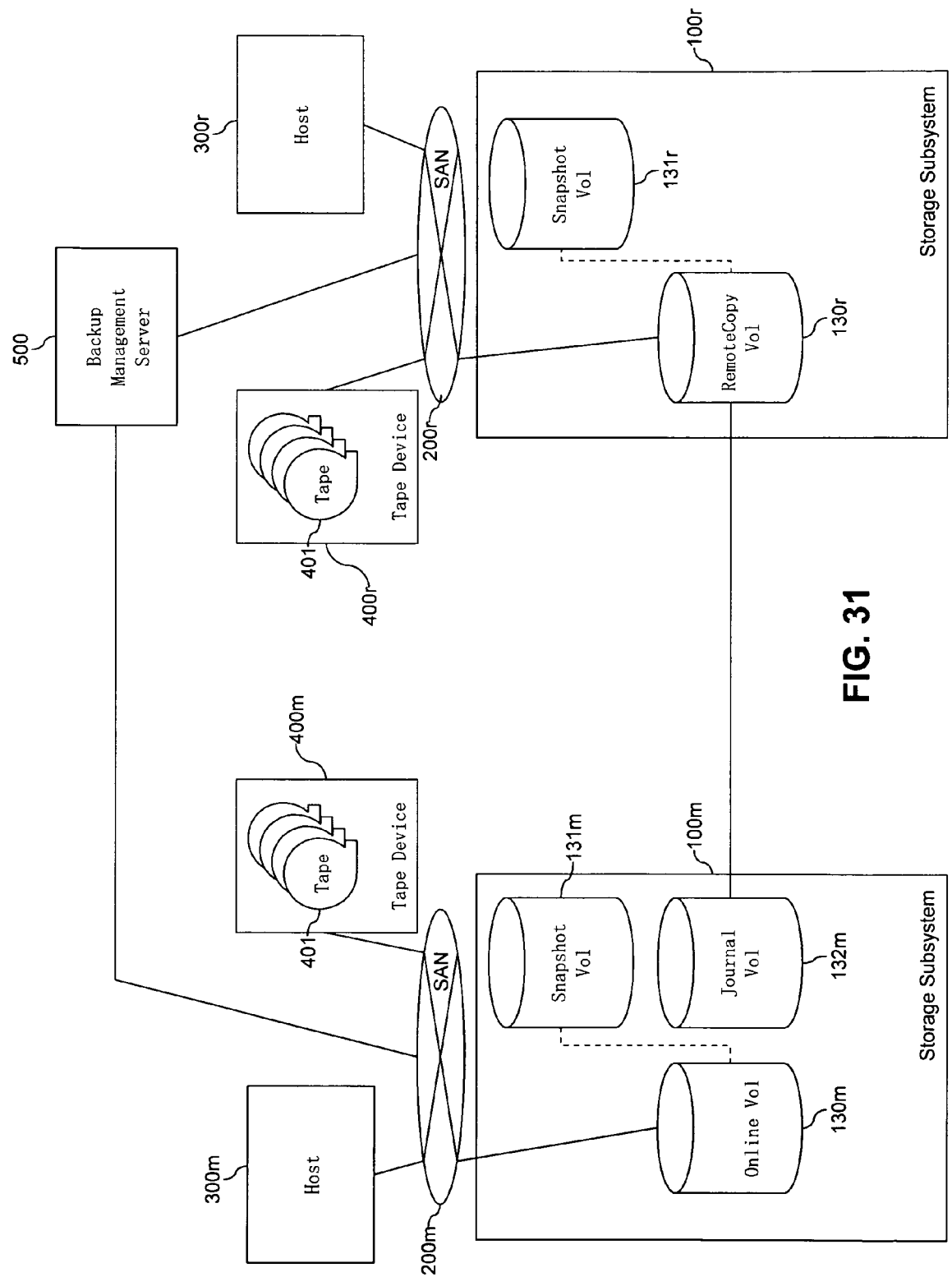
FIG. 31 illustrates an exemplary logical structure of the system shown in FIG. 27.

FIG. 31 illustrates an exemplary logical structure of the system shown in FIG. 27. As compared with FIG. 23 of the first embodiment, the second storage subsystem 100r further includes a logical volume 131r which is a second backup or snapshot volume for the remote copy logical volume 130r.

Figure 32:
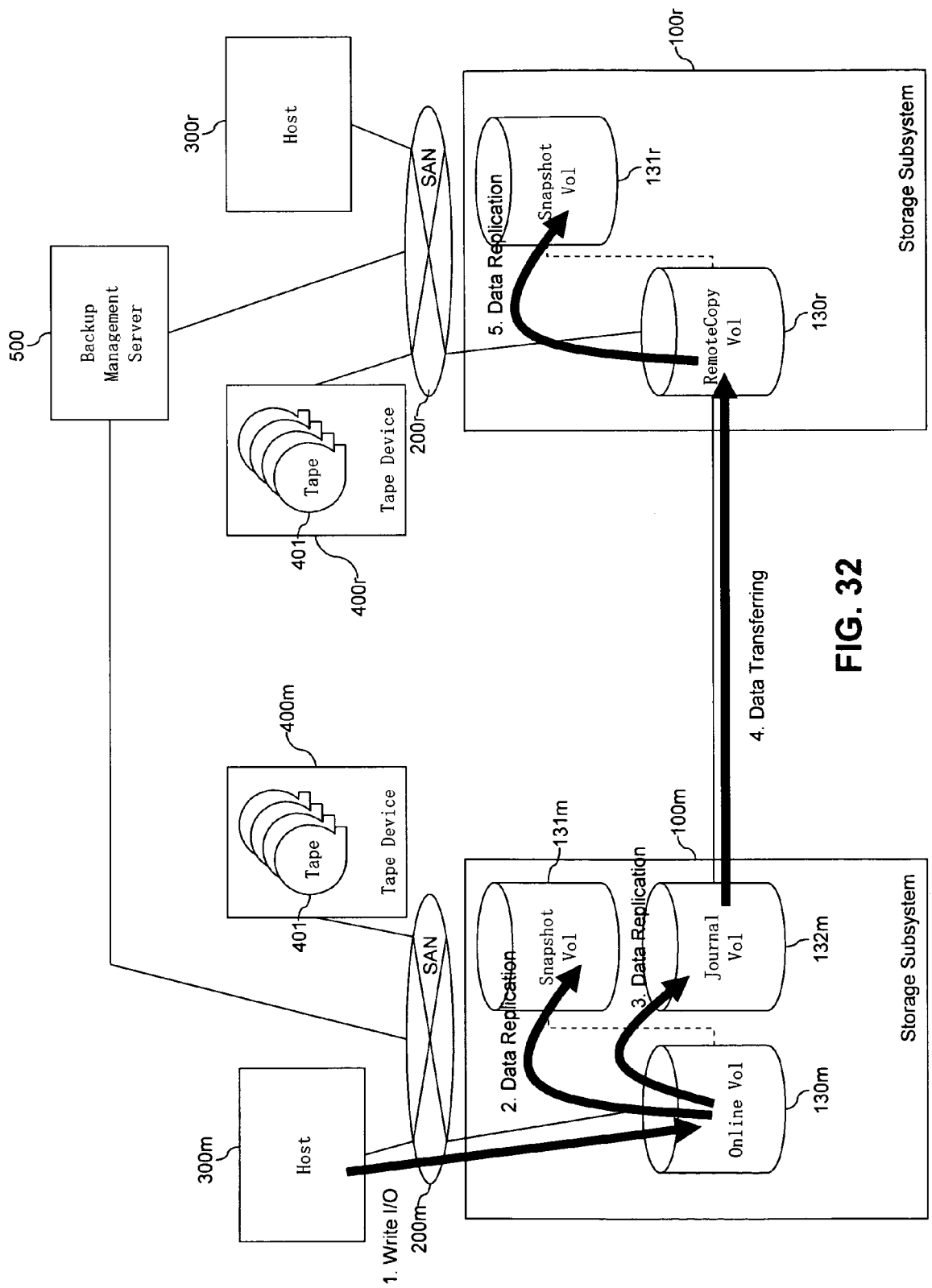
FIG. 32 illustrates an example of a write I/O data flow in the snapshot and remote copy environment.

FIG. 32 illustrates an example of a write I/O data flow in the snapshot and remote copy environment. The first host computer 300m initiates access to the logical volume 130m. The first storage subsystem 100m replicates the write I/O to the snapshot volume 131m. The first storage subsystem 100m further replicates the write I/O and stores it and the control information to the journal volume 132m in order. The second storage subsystem 100r reads the journal volume 132m. First, the second storage subsystem 100r checks the control information and determines the I/O address. Next, the second storage subsystem 100r stores the write I/O data to the determined I/O address of the remote copy volume 130r. As compared to FIG. 24 of the first embodiment, the second storage subsystem 100r further replicates the write I/O by remote copy operation to the second or remote snapshot volume 131r.

Figure 33:
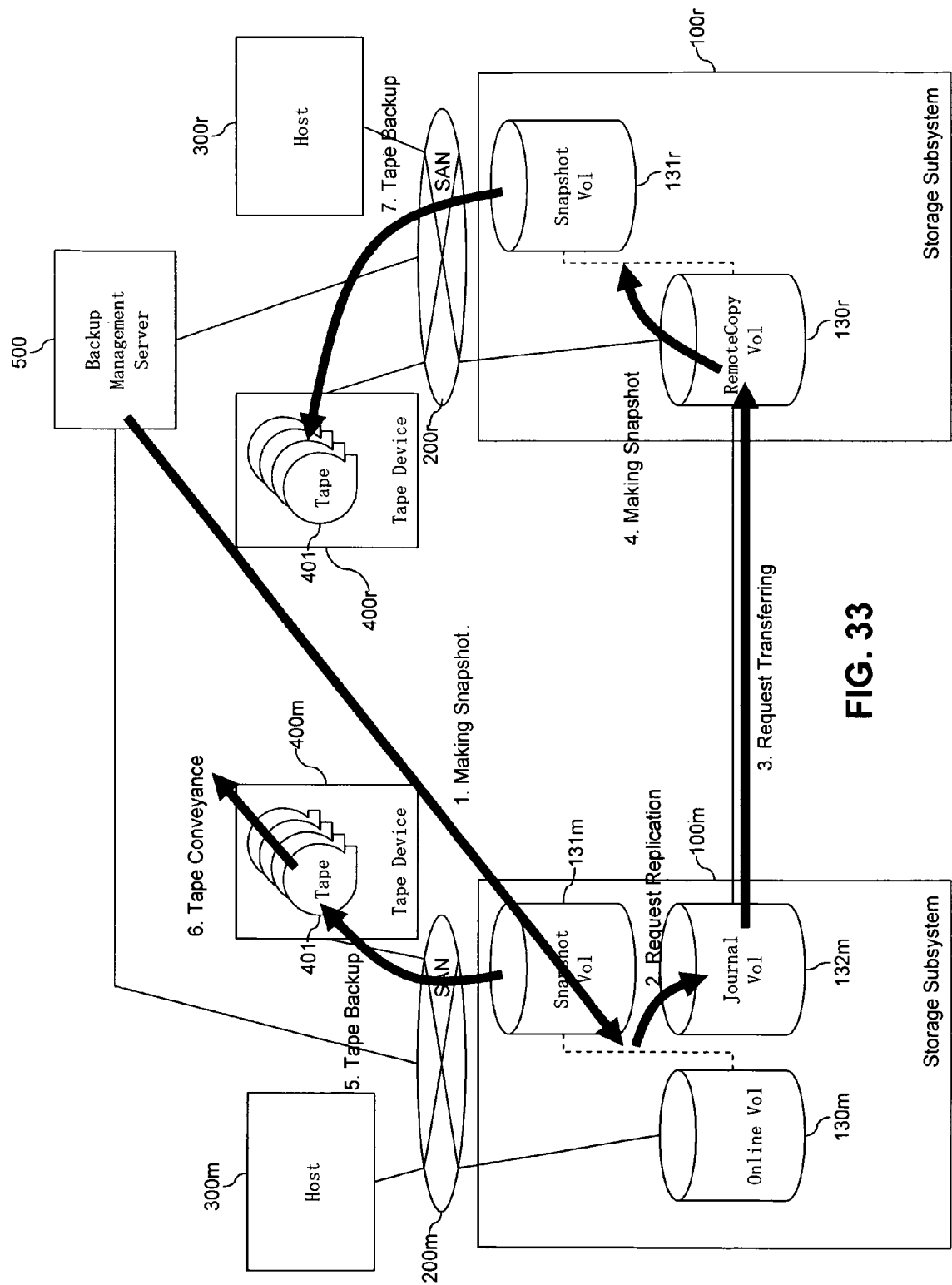
FIG. 33 illustrates an example of a process of a snapshot request and backup operation.

FIG. 33 illustrates an example of a process of a snapshot request and backup operation. The backup management server 500 sends a snapshot request to the first storage subsystem 100m. The first storage subsystem 100m changes the pair status between the logical volume 130m and the snapshot volume 131m. The first storage subsystem 100m further stores the snapshot request to the journal volume 132m in order in the same way as write I/Os. The second storage subsystem 100r reads the journal volume 132m. First, the second storage subsystem 100r checks the control information and finds the snapshot request. Next, the second storage subsystem 100r changes the pair status between the remote copy logical volume 130r and the second snapshot logical volume 131r. The backup management server 500 instructs the tape device 400m to backup from the snapshot volume 131m to the tape 401 and stores the backup information. A user then withdraws the tape 401 and sends it to a warehouse. The backup management server 500 further instructs the second tape device 400r to backup from the second snapshot logical volume 131r to the tape 401' and store the backup information.

Figure 34:
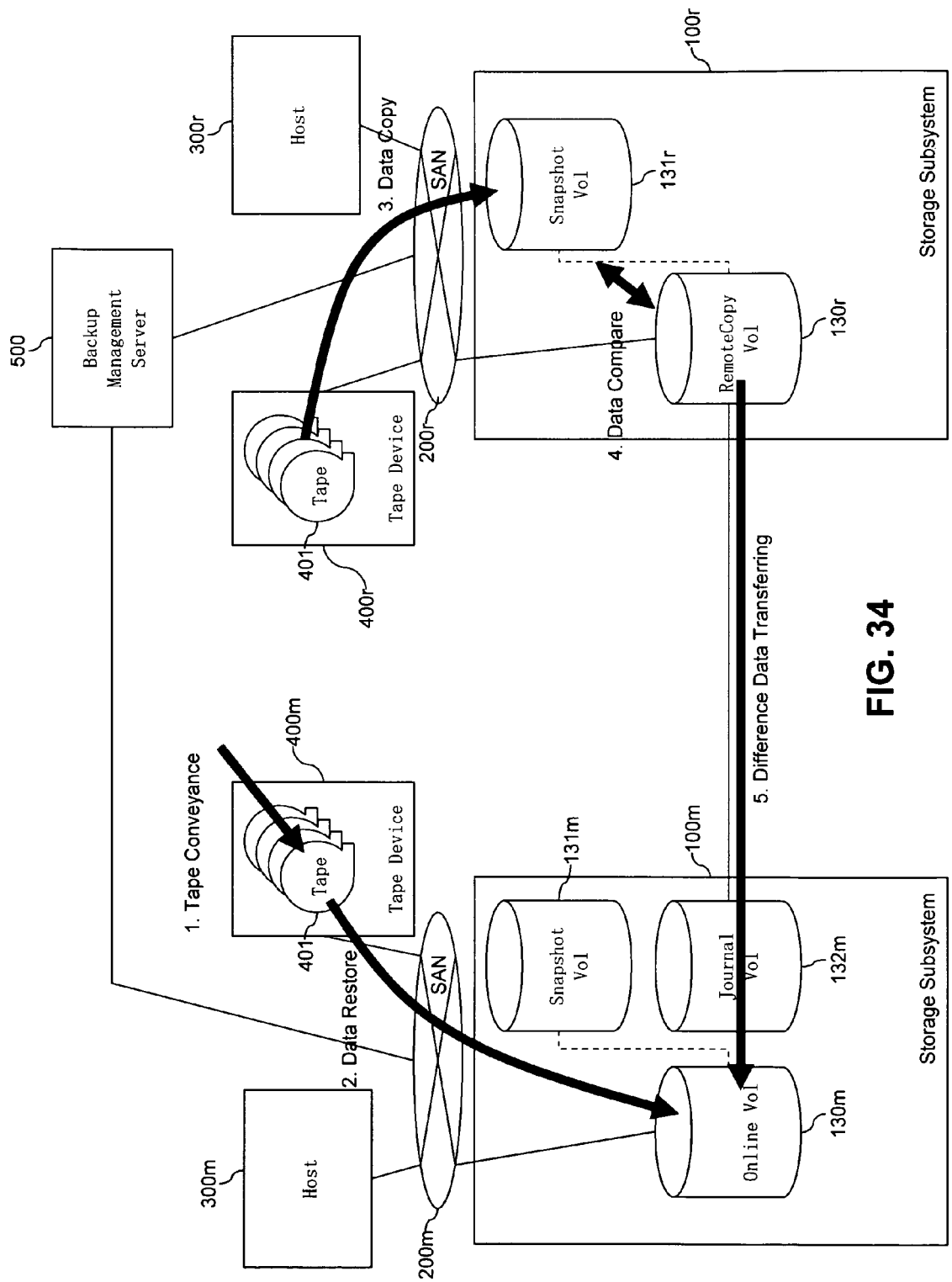
FIG. 34 illustrates an example of a process of a failback operation.

FIG. 34 illustrates an example of a process of a failback operation. A user sends the tape 401 from a warehouse and places it into the first tape device 400m. The backup management server 500 instructs the first tape device 400m to restore data from the tape 401 to the snapshot volume 131m, instructs the second tape device 400r to restore the tape 401' to the second snapshot volume 131r, and instructs the second storage subsystem 100r to restore data from the remote copy volume 130r. The second storage subsystem 100r searches the different data area from the Remote Copy Difference Table 112-16-2 and the result of comparing the remote copy volume 130r and the second snapshot volume 131r. The second storage subsystem 100r then sends the different data area from the remote copy volume 130r to the online volume 130m of the first storage subsystem. Based on the restored snapshot data at a restored snapshot time from the tape 401 and the restored data from the remote copy volume 130r at a restoring time using the different data area determined from the Remote Copy Difference Table 112-16-2 and the result of comparing the remote copy volume 130r and the second snapshot volume 131r, the second storage subsystem 100r then determines the difference data between the snapshot data at the restored snapshot time and the restored data at the restoring time, and sends the difference data from the remote copy volume 130r to the online volume 130m of the first storage subsystem. The low traffic failback operation can be completed.

In this embodiment, determination of the difference data is based on the different data area obtained from the Remote Copy Difference Table 112-16-2 as well as the result of comparing the remote copy volume 130r and the second snapshot volume 131r. This embodiment requires that the same snapshot images be made in the local storage and the remote storage to record the difference from the snapshot timing to the remote storage. However, if the snapshot timing is different between the local storage subsystem 100m and remote storage subsystem 100r, it will cause a data loss on failback. Because the remote copy transfers data asynchronously, the remote storage subsystem 100r may fail to record the write I/O that occurs during the period from the snapshot point on the local storage 100m to the snapshot point on the remote storage 100r. Thus, the use of the different data area from the Remote Copy Difference Table 112-16-2 is appropriate. This is further explained using FIG. 34A with reference to FIGS. 23A and 23B.

Figure 34A:
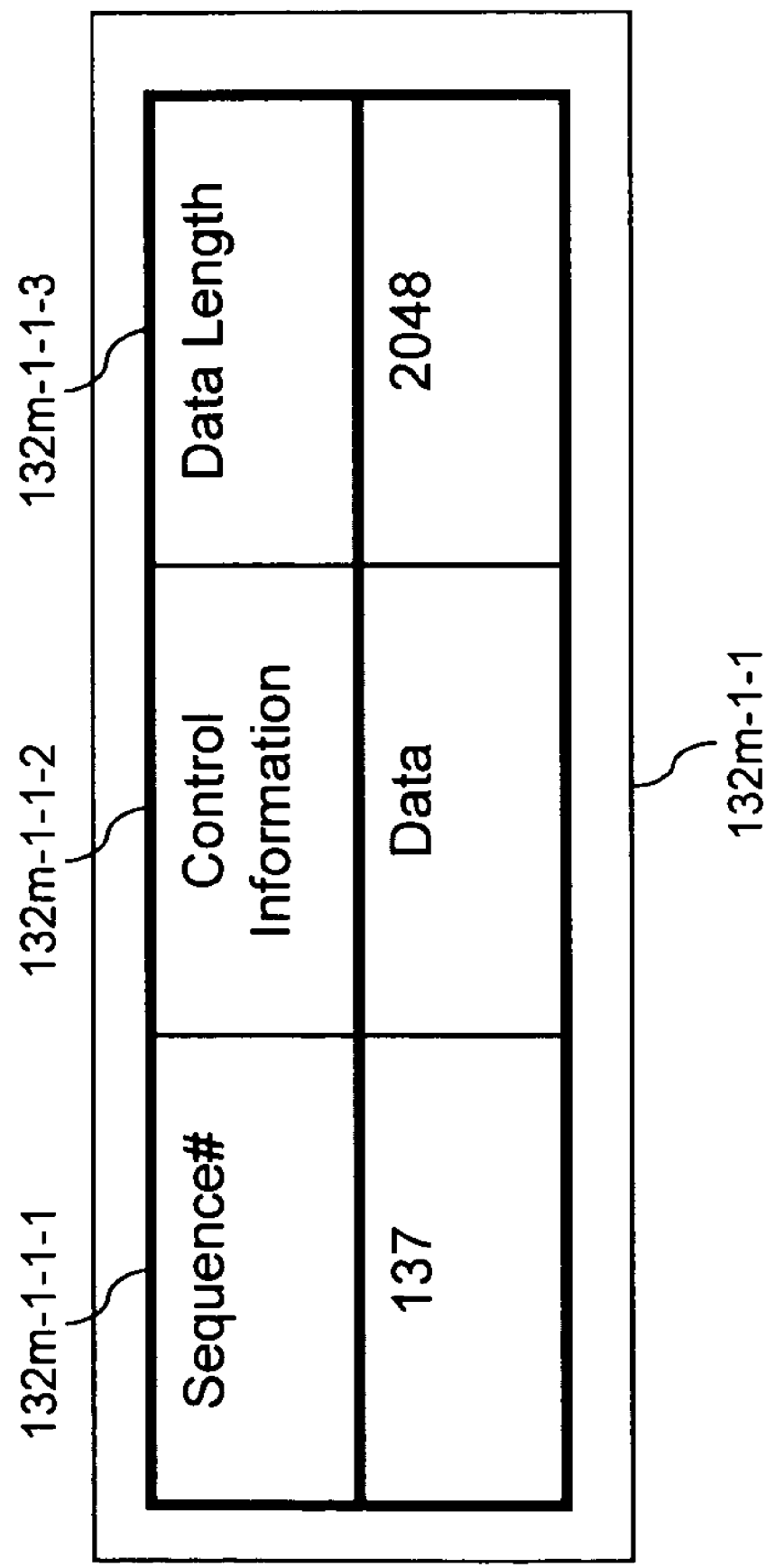
FIG. 34A illustrates an example of the structure of a Journal Management Table for the journal data of FIG. 23B.

FIG. 34A illustrates an example of the structure of the Journal Management Table 132m-1-1 for the journal data 132m-1 of FIG. 23B. The Journal Management Table 132m-1-1 includes sequence number 132m-1-1-1, control information 132m-1-1-2, and data length 132m-1-1-3. The sequence number 132m-1-1-1 stores the number of sequence of the I/O. The control information 132m-1-1-2 stores the kind of I/O. In this context, "data" means write I/O data, and "snapshot" means that snapshot request occurs at the snapshot timing. The data length 132m-1-1-3 stores the size of the written I/O data. The Remote Copy Difference Table 112-16-2 makes use of this information to capture the difference in snapshot timing between the local storage subsystem 100m and the remote storage subsystem 100r.

Third Embodiment

The third embodiment of the invention involves a comparison of the source and target volume data by hash calculation to find the different data area. The following describes the third embodiment focusing on the differences from the first embodiment.

Figure 35:
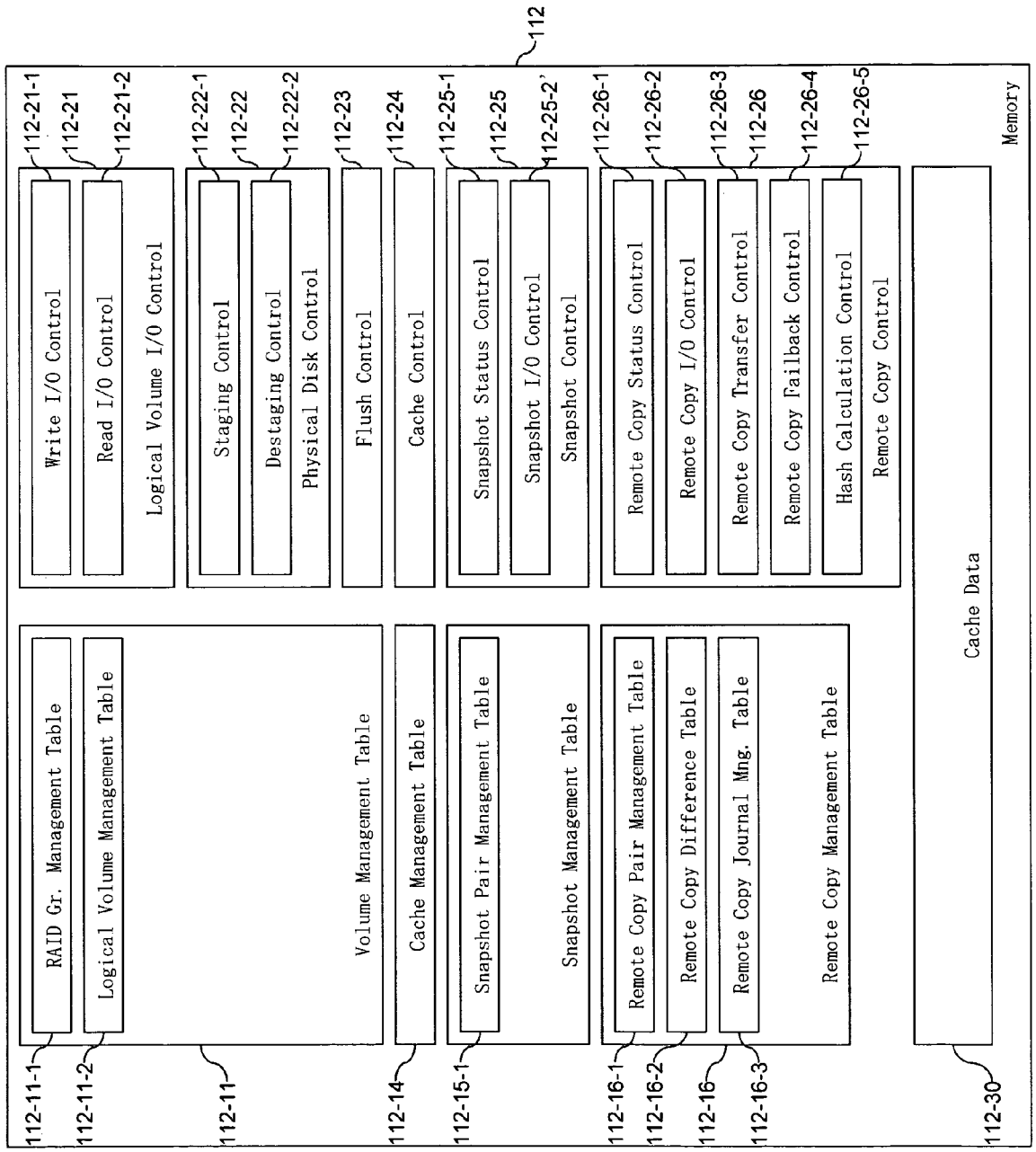
FIG. 35 illustrates an example of the memory according to a third embodiment of the invention.

FIG. 35 illustrates an example of the memory 112 according to the third embodiment. As compared with FIG. 3 of the first embodiment, the Snapshot Difference Table 112-15-2 is removed, while the Hash Calculation Control 112-26-5 is added. The Hash Calculation Control 112-26-5 reads the parts of a volume and calculates hash value of the each part. The Hash Calculation Control 112-26-5 further compares the hash value and finds the data difference between the remote copy source and target volume. The Snapshot I/O Control 112-25-2' is partly changed from the Snapshot I/O Control 112-25-2 of the first embodiment.

Figure 36:
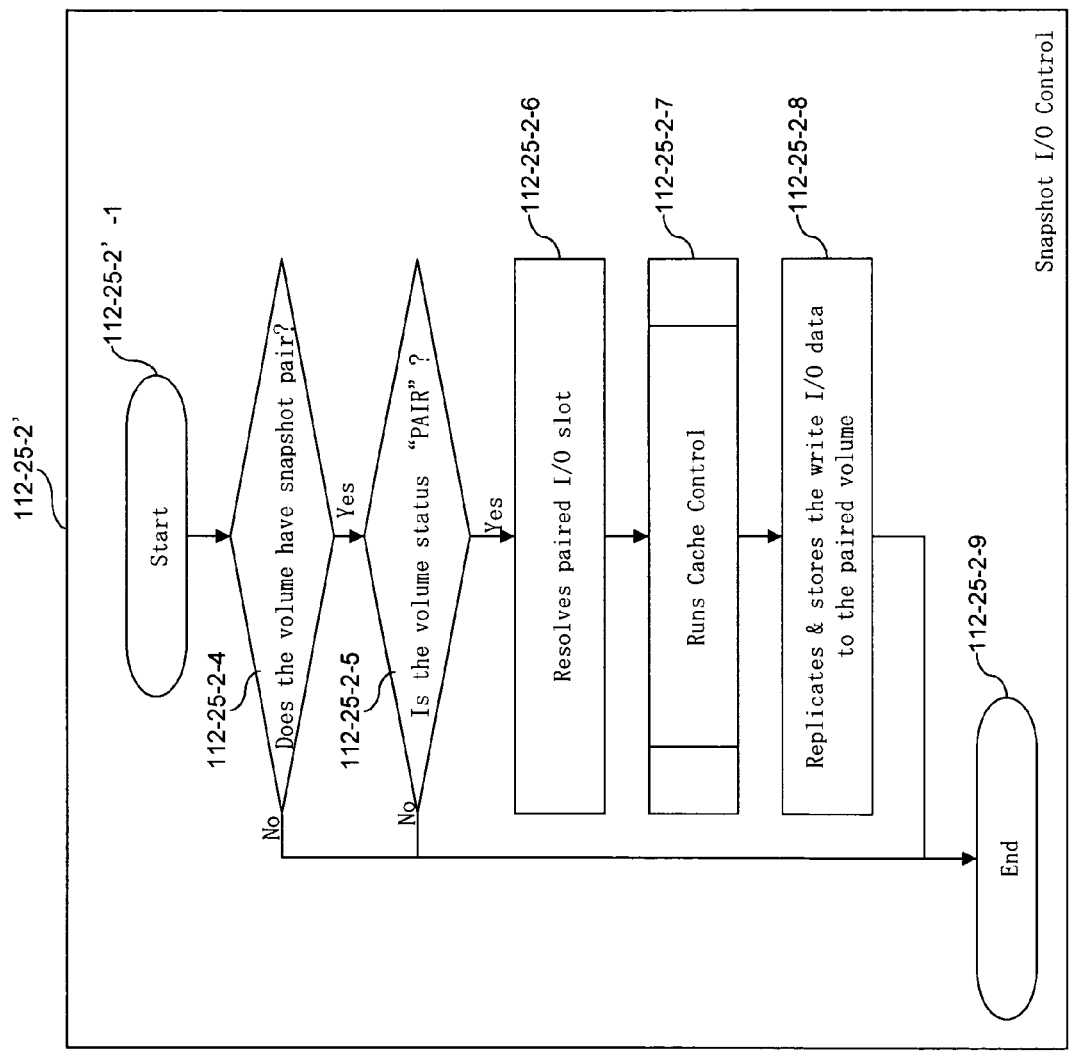
FIG. 36 illustrates an example of a process flow of the Snapshot I/O Control in FIG. 35.

FIG. 36 illustrates an example of a process flow of the Snapshot I/O Control 112-25-2'. As compared with FIG. 18 of the first embodiment, steps 112-25-2-2 and 112-25-2-3 are removed because the Snapshot Difference Table 112-15-1 is removed. The other process steps remain the same.

Figure 37:
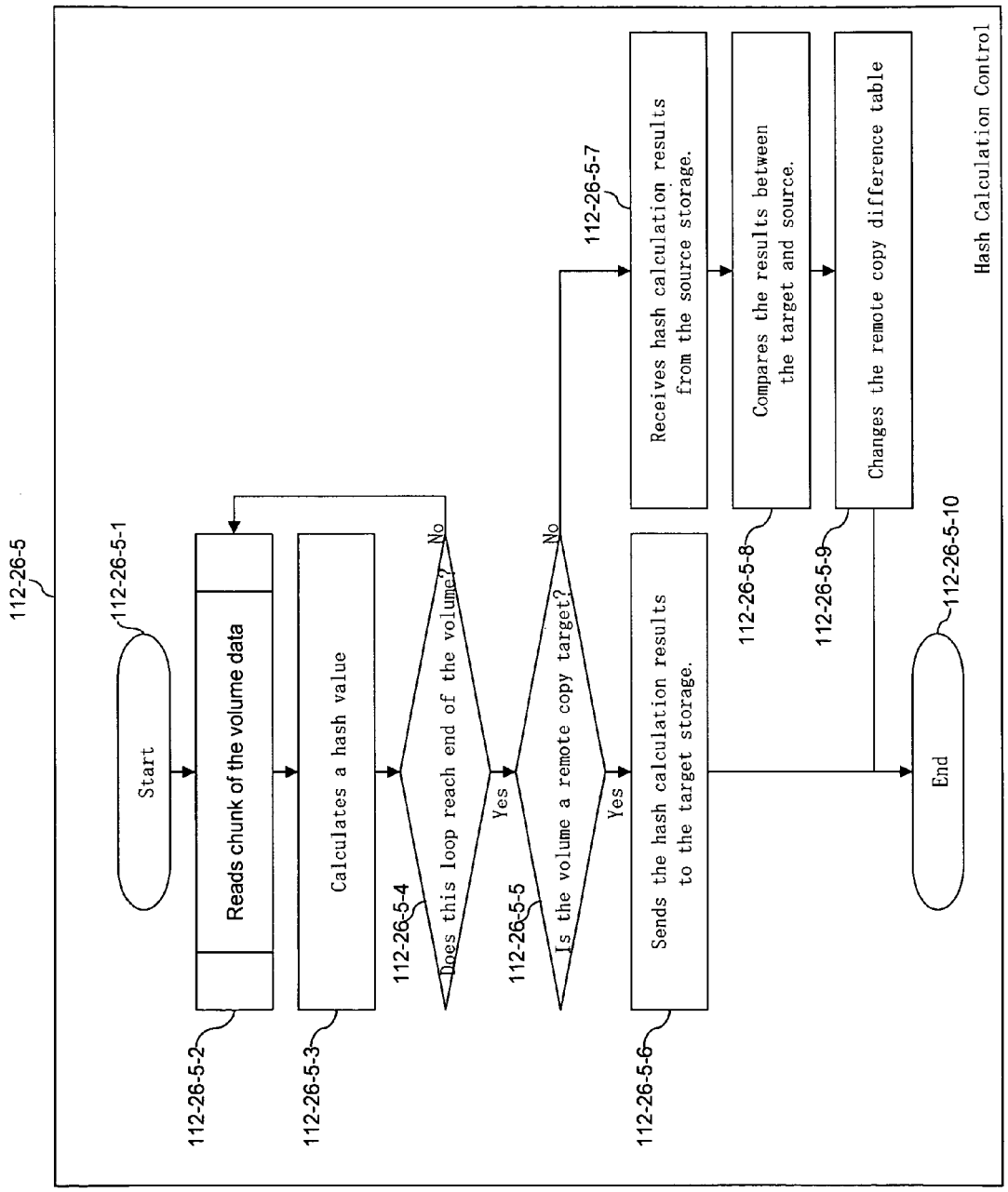
FIG. 37 illustrates an example of a process flow of the Hash Calculation Control in FIG. 35.

FIG. 37 illustrates an example of a process flow of the Hash Calculation Control 112-26-5. To start the process (112-26-5-1), the CPU 111 transfers to the cache memory 112-30 from the disks 121 a part of the designated volume by calling the Staging Control 112-22-1 (step 112-26-5-2). The CPU 111 calculates the hash value of the transferred data (step 112-26-5-3). The CPU 111 repeats the process in steps 112-26-5-2 and 112-26-5-3 until it reaches the end of the designated volume (step 112-26-5-4). Next, the CPU 111 checks the volume to determine whether it is a remote copy target or a source (step 112-26-5-5). If the volume is a remote copy target, the CPU 111 transfers the hash values to the paired storage subsystem storing the target volume (step 112-26-5-6). Otherwise, the CPU 111 receives the hash values from the paired storage subsystem storing the source volume (step 112-26-5-7) and compares the source and target hash values (step 112-26-5-8). If the hash values are different, the CPU 111 recognizes that write I/O has occurred to the area. The CPU 111 changes the Remote Copy Difference Table 112-16-2 of the area in which write I/O occurred to "Changed" (step 112-26-5-9). The process ends (112-26-5-10).

Figure 38:
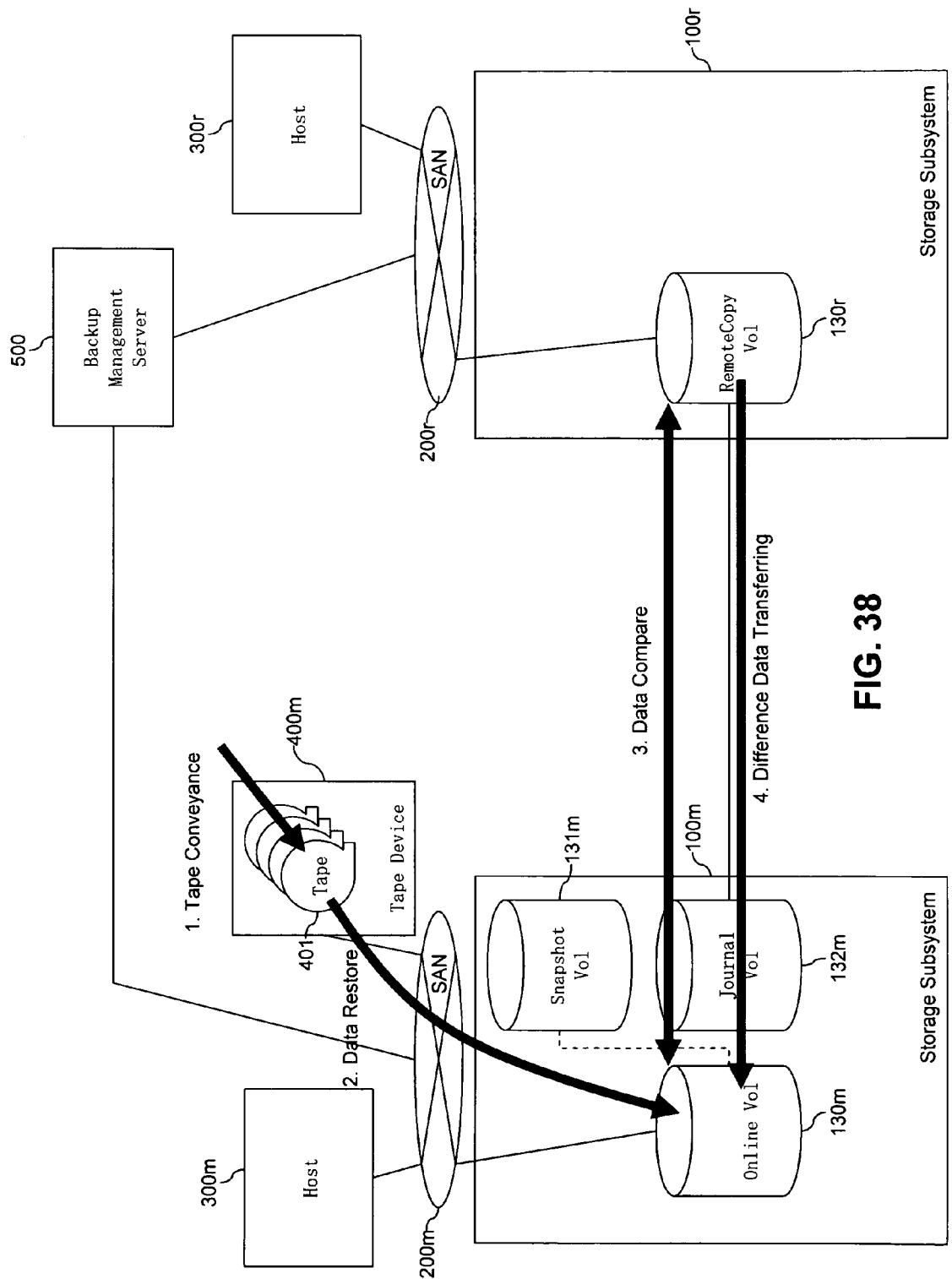
FIG. 38 illustrates an example of a process of a failback operation.

FIG. 38 illustrates an example of a process of a failback operation. A user sends the tape 401 from a warehouse and places it into the tape device 400m. The backup management server 500 instructs the tape device 400m to restore data from the tape 401 to the snapshot volume 131m and instructs the second storage subsystem 100r to restore the data from the remote copy volume 130r. As compared with FIG. 26 of the first embodiment, the second storage subsystem 100r compares the source and target volume data by hash calculation and finds the different data area, and changes the Remote Copy Difference Table 112-16-2 to show the different data area from the snapshot data. The second storage subsystem 100r then sends the different data area from the remote copy volume 130r to the online volume 130m of the first storage subsystem. Based on the restored snapshot data from the tape 401 at a restored snapshot time and the restored data from the remote copy volume 130r at a restoring time using the different data area determined from comparing the source and target volume data by hash calculation, the second storage subsystem 100r then determines the difference data between the snapshot data at the restored snapshot time and the restored data at the restoring time, and sends the difference data from the remote copy volume 130r to the online volume 130m of the first storage subsystem. The low traffic failback operation can be completed.

From the foregoing, it will be apparent that the invention provides methods, apparatuses and programs stored on computer readable media for achieving low traffic failback remote copy. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A computer system for storing data, comprising:
    a first storage device including a first processor, a first memory and a first volume to store data and a journal volume;
    a second storage device including a second processor, a second memory, a second volume to copy data from the first volume and a third volume to store data as a snapshot data;
    wherein the first storage device is configured to store the data and a snapshot request in the journal volume according to an order of arrival if the data is stored in the first storage device as snapshot data,
    wherein the second storage device is configured to read data from the journal volume asynchronously, to determine whether the data read from the journal volume has the snapshot request, and to store the data stored in the journal volume to the third volume as the snapshot data when the snapshot request is found,
    wherein the second storage device is configured to identify difference data from a snapshot time at which the snapshot was taken, based on the order of arrival, and
    wherein data is restored by the difference data and the snapshot data stored in the third volume.

2. The computer system according to claim 1, wherein the first storage device is configured to provide asynchronous copy for copying data from the first volume of the first storage device to the second volume of the second storage device.

3. The computer system according to claim 1, further comprising:
    a first tape device;
    a first snapshot device configured to store snapshot data of the data in the first storage device; and
    a backup management server which is configured to instruct the first tape device to back up the snapshot data from the first snapshot device.

4. The computer system according to claim 3, further comprising:
a second tape device; and
a second snapshot device configured to store snapshot data of the data stored in the second storage device;
wherein the backup management server is configured to instruct the second tape device to back up the snapshot data from the second snapshot device.

5. The computer system according to claim 3, wherein the backup management server is configured to send the snapshot request to the first storage device.

6. The computer system according to claim 1, further comprising:
a second snapshot device configured to store snapshot data of the data stored in the second storage device;
a tape device; and
a backup management server which is configured to instruct the tape device to back up the snapshot data from the second snapshot device.

7. A method for storing data in a computer system which includes a first storage device including a first processor, a first memory and a first volume to store data and a journal volume and a second storage device including a second processor, a second memory, a second volume to copy data from the first volume and a third volume to store data as a snapshot data, the method comprising:
storing, by the first storage device, the data and a snapshot request in the journal volume according to an order of arrival if the data is stored in the first storage device as snapshot data;
reading, by the second storage device, data from the journal volume asynchronously;
determining, by the second storage device, whether the data read from the journal volume has the snapshot request;
storing, by the second storage device, the data stored in the journal volume to the third volume as the snapshot data when the snapshot request is found; and
identifying, by the second storage device, difference data from a snapshot time at which the snapshot was taken, based on the order of arrival,
wherein data is restored by the difference data and the snapshot data stored in the third volume.

8. The method according to claim 7, further comprising:
providing asynchronous copy for copying data from the first volume of the first storage device to the second volume of the second storage device.

9. The method according to claim 7, further comprising:
storing snapshot data of the data in the first storage device in a first snapshot device; and
backing up the snapshot data from the first snapshot device onto a first tape device.

10. The method according to claim 9, further comprising:
storing snapshot data of the data in the second storage device in a second snapshot device; and
backing up the snapshot data from the second snapshot device onto a second tape device.

11. The method according to claim 7, further comprising:
storing snapshot data of the data in the second storage device in a second snapshot device; and
backing up the snapshot data from the second snapshot device onto a tape device.

* * * * *